(12) United States Patent
Yagi et al.

(10) Patent No.: US 7,880,145 B2
(45) Date of Patent: Feb. 1, 2011

(54) RADIATION IMAGING APPARATUS AND ITS DRIVING METHOD AND PROGRAM

(75) Inventors: Tomoyuki Yagi, Honjo (JP); Tadao Endo, Honjo (JP); Toshio Kameshima, Kumagaya (JP); Katsuro Takenaka, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/556,607

(22) Filed: Sep. 10, 2009

(65) Prior Publication Data

US 2010/0001198 A1 Jan. 7, 2010

Related U.S. Application Data

(62) Division of application No. 12/271,958, filed on Nov. 17, 2008, now Pat. No. 7,645,995.

(30) Foreign Application Priority Data

Dec. 3, 2007 (JP) .............................. 2007-312825

(51) Int. Cl.
*H01L 27/146* (2006.01)
(52) U.S. Cl. ................................ 250/370.09
(58) Field of Classification Search ................................ 250/370.01–370.15; 378/98.8
See application file for complete search history.

(56) References Cited

U.S. PATENT DOCUMENTS

| | | | |
|---|---|---|---|
| 6,453,008 B1 | 9/2002 | Sakaguchi et al. | 378/98.7 |
| 7,102,260 B2 | 3/2006 | Endo | 250/370.11 |
| 7,154,009 B2 | 12/2006 | Endo | 260/370.11 |
| 7,277,926 B1 | 6/2007 | Kameshima et al. | 378/98.9 |
| 7,342,221 B2 | 3/2008 | Takenaka et al. | 250/252.1 |
| 7,343,000 B2 | 3/2008 | Kameshima et al. | 378/98.9 |
| 7,381,963 B2 | 6/2008 | Endo et al. | 250/370.09 |
| 7,386,089 B2 | 6/2008 | Endo et al. | 378/5 |
| 7,403,594 B2 | 7/2008 | Endo et al. | 378/114 |
| 7,408,167 B2 | 8/2008 | Kameshima et al. | 250/370.09 |
| 7,442,939 B2 | 10/2008 | Yagi et al. | 250/370.11 |
| 7,446,345 B2 | 12/2008 | Kameshima et al. | 348/220.1 |
| 7,470,911 B2 | 12/2008 | Yagi | 250/370.14 |
| 7,476,027 B2 | 1/2009 | Takenaka et al. | 378/207 |
| 7,491,960 B2 | 2/2009 | Takenaka et al. | 250/580 |
| 2003/0072418 A1 | 4/2003 | Albagli et al. | 378/207 |
| 2004/0017891 A1 | 1/2004 | Endo | 378/98.8 |
| 2004/0026625 A1* | 2/2004 | Arakawa | 250/370.11 |
| 2004/0174953 A1 | 9/2004 | Ikeda et al. | 378/98.8 |

(Continued)

*Primary Examiner*—David P Porta
*Assistant Examiner*—Kiho Kim
(74) *Attorney, Agent, or Firm*—Fitzpatrick, Cella, Harper & Scinto

(57) ABSTRACT

As a radiation imaging apparatus which can easily and effectively correct line noise, there is provided a radiation imaging apparatus having: a conversion unit having a pixel region in which a plurality of pixels each having a conversion element (202) for converting radiation into an electric charge and a switching element (201) for outputting an electric signal based on the electric charge are arranged in a matrix; a capacitor element (301) arranged outside the pixel region; a reading out circuit unit (108) for reading out the electric signals from the pixels row by row and reading out, in parallel, a signal from the capacitor element and the electric signal from the pixel; and a correction unit for correcting the electric signal based on the signal from the capacitor element.

7 Claims, 13 Drawing Sheets

U.S. PATENT DOCUMENTS

| | | | |
|---|---|---|---|
| 2005/0024665 A1 | 5/2005 | Endo et al. | 250/370.14 |
| 2006/0065845 A1 | 3/2006 | Yamaguchi | 250/370.09 |
| 2006/0119719 A1 | 6/2006 | Kameshima | 348/308 |
| 2007/0029492 A1* | 2/2007 | Abe | 250/370.09 |
| 2007/0040099 A1 | 2/2007 | Yokoyama et al. | 250/208.1 |
| 2007/0125952 A1 | 6/2007 | Endo et al. | 250/369 |
| 2007/0131843 A1 | 6/2007 | Yokoyama et al. | 250/25 |
| 2007/0210258 A1 | 9/2007 | Endo et al. | 250/370.09 |
| 2008/0013686 A1 | 1/2008 | Kameshima et al. | 378/98 |
| 2008/0083876 A1 | 4/2008 | Endo et al. | 250/369 |
| 2008/0217548 A1 | 9/2008 | Kameshima et al. | 250/370.09 |
| 2008/0226031 A1 | 9/2008 | Yokoyama et al. | 378/98.7 |
| 2009/0001276 A1 | 1/2009 | Yagi et al. | 250/370.09 |
| 2009/0021607 A1 | 1/2009 | Takenaka et al. | 348/231.99 |
| 2009/0121143 A1 | 5/2009 | Takenaka et al. | 250/369 |

* cited by examiner

RADIATION IMAGING APPARATUS AND ITS DRIVING METHOD AND PROGRAM

RELATED APPLICATIONS

This application is a divisional of application Ser. No. 12/271,958, filed Nov. 17, 2008, claims benefit of the filing date of that application under 35 U.S.C. §120, and claims benefit under 35 U.S.C. §119 of Japanese Patent Application No. 2007-312825, filed Dec. 3, 2007; the entire contents of both mentioned prior applications are hereby incorporated by reference herein.

BACKGROUND OF THE INVENTION

1. Field of the Invention

The present invention relates to a radiation imaging apparatus and its driving method and program.

2. Description of the Related Art

In recent years, a digital radiation imaging apparatus using a sensor array in which conversion elements such as photoelectric conversion elements each for converting light into an electric signal have been formed on an insulating substrate such as glass has been put into practical use and has become widespread owing to the development of semiconductor technology.

The sensor array (conversion unit) which is used in the radiation imaging apparatus has a pixel region in which a plurality of pixels each having a conversion element for converting radiation such as incident X-rays into an electric charge and a switching element for outputting an electric signal based on the converted electric charge are arranged in a matrix. As a conversion element, for example, an element using a wavelength converter for converting radiation into light and a photoelectric conversion element for converting the light into an electric charge or an element for directly converting the radiation into the electric charge is used. As a switching element, a thin film transistor (hereinbelow, referred to as a TFT) using amorphous silicon or polysilicon, a diode, or the like is used. A bias wiring for applying a bias for setting the conversion element into a state where it can convert the radiation or light into the electric charge is connected in common to the conversion elements of a plurality of pixels. The electric signals of the pixels are output row by row because a driving signal is supplied from a driving circuit unit to a driving wiring connected in common to the switching elements of a plurality of pixels arranged along a row and the switching elements are enabled row by row. A shift register is desirably used for the driving circuit unit and sequentially supplies the driving signals to a plurality of driving wirings arranged along a column. The electric signals generated from a plurality of pixels arranged along the row are read out in parallel to a reading out circuit unit through a signal wiring connected in common to the switching elements of a plurality of pixels arranged along the column. At least an operation amplifier for amplifying the read-out electric signal and a sampling and holding circuit (hereinbelow, also referred to as an S/H circuit) for temporarily holding a signal from the operation amplifier are provided for the reading out circuit unit for every plurality of so many signal wirings arranged along the row. A multiplexer for converting the signals which have been read out in parallel to the S/H circuit into a serial signal and reading out the serial signal is also provided for the reading out circuit unit. The parallel signals which have been read out of the sensor array row by row are sequentially read out and converted into a serial signal. The analog serial signal read out of the reading out circuit unit is converted into a digital signal by an analog to digital converter (hereinbelow, referred to as an A/D converter). By reading out the analog signals row by row from the pixels of all rows and converting them into digital signals, digital image data corresponding to one image (frame) can be obtained from the radiation imaging apparatus.

In the above radiation imaging apparatus, the signals are read out row by row. Therefore, for example, there is a case where noises are mixed in when the driving circuit unit enables the switching elements row by row or when the electric signals which have been read out in parallel from the sensor array are held in a plurality of S/H circuits provided for every signal wiring. It is considered that such noises are caused by electromagnetic noise from outside the apparatus, a fluctuation of an operating voltage which is supplied from a power source to the sensor array, driving circuit unit, and reading out circuit unit, a fluctuation of a reference voltage, or the like. There is a problem in that an artifact in the form of a lateral stripe (row direction) occurs in the image data from which the above noise has been obtained (hereinbelow, such an artifact is referred to as a line noise).

The line noise is more liable to be perceived by a diagnosing person than is a noise component which appears at random in the image data (hereinbelow, such a noise component is referred to as random noise) and is a large factor in determining picture quality.

According to U.S. Patent Application Publication No. 2004-0174953, means for detecting line noise by using an output of a dark portion of an X-ray image and, further, correcting is provided, thereby removing the line noise and improving picture quality.

According to U.S. Patent Application Publication No. 2006-0065845, in order to reduce a line noise which is generated through a signal wiring, a wiring is prepared in parallel with the signal wiring and a difference between noise generated in the prepared wiring and noise generated in the signal wiring is calculated and read out, thereby correcting the line noise.

SUMMARY OF THE INVENTION

However, according to the correcting process disclosed in U.S. Patent Application Publication No. 2004-0174953, since the output of the dark portion of a sensor array is used, at the time of correction, the picture quality is influenced by noise due to a dark current of the pixel or by fixed pattern noise due to thermal noise, a lattice defect, or the like. As a countermeasure against such an influence, a weighted mean of a plurality of lines is obtained. However, since the amount of dark portion which is used is not constant depending on photographing, the degree to which the influence of the noise due to the dark current of the pixel or the fixed pattern noise due to the thermal noise, lattice defect, or the like, also is not constant, and there is a risk that the picture quality in turn will vary depending on the photographing. Particularly, in the form having a switching element for every pixel, since the construction of and the manufacturing process for the switching element are complicated and variation occurs in characteristics of the switching elements or a lattice defect or the like occurs, there is a risk that the influence of the fixed pattern noise becomes more remarkable.

Further, if U.S. Patent Application Publication No. 2004-0174953 is used, in addition to the pixels necessary to obtain the image data, pixels for executing the photographing of the dark portion are necessary. In order to make the correction more precise, a larger number of pixels for executing the photographing of the dark portion is necessary. It is, therefore, necessary to use an imaging apparatus in which the area of the pixel region of the sensor array is increased and miniaturization of the apparatus is obstructed.

Further, a plurality of processes such as a process for discriminating a dark portion region from the image, a process for discriminating a line noise amount of the dark portion region from the image, a process for correcting the line noise, and the like have to be executed at a high speed in a manner similar to those for a motion image. In such a case, a delay time that occurs from the obtaining of the image to a display of the image is extended, and it becomes a factor of deterioration in workability at the time of an operation. In order to execute those processes in a short time, a correspondingly powerful processing unit is necessary, so that the system becomes expensive.

According to U.S. Patent Application Publication No. 2006-0065845, wirings, in which a construction of the signal wiring which becomes a factor in the generation of line noise and a construction of the wiring which is capacitively coupled with the signal wiring are made identical, are separately provided, thereby correcting the line noise. According to such a method, an aperture ratio of the conversion elements deteriorates by a degree corresponding to the wirings which have separately been provided, the sensitivity of the conversion elements deteriorates, and eventually, the SNR (signal to noise ratio) of the whole system decreases. According to the above structure, since the separately provided wirings and the driving wiring cross, the wiring capacitance of the driving wiring increases. Therefore, a large distortion occurs in the driving signal and it becomes difficult to execute a high-speed operation of the sensor array such as a photographing of a motion image. There is a risk that the enabling time of the switching element of a pixel near the driving circuit unit and that of the switching element of a pixel far from the driving circuit unit can each change, so that there is a risk that an offset in the row direction occurs in the image obtained.

It is an object of the invention to solve the foregoing problems and to provide a radiation imaging apparatus which can execute high-speed driving operation without a deterioration in picture quality and can easily correct line noise, and to provide a driving method and a program for such an apparatus.

According to the invention, there is provided a radiation imaging apparatus comprising: a conversion unit having a pixel region in which a plurality of pixels each having a conversion element for converting a radiation into an electric charge and a switching element for outputting an electric signal based on the electric charge are arranged in a matrix; a capacitor element arranged outside of the pixel region; a reading out circuit unit for reading out the electric signals from the pixels row by row and reading out, in parallel, a signal from the capacitor element and the electric signal from the pixel; and a correction unit for correcting the electric signal based on the signal from the capacitor element.

According to the invention, there is provided a controlling method of a radiation imaging apparatus comprising: a conversion unit having a pixel region in which a plurality of pixels each having a conversion element for converting a radiation into an electric charge and a switching element for outputting an electric signal based on the electric charge are arranged in a matrix; a capacitor element arranged outside of the pixel region; and a reading out circuit unit for reading out the electric signals from the pixels row by row, wherein the method comprises steps of: reading out by the reading out circuit unit, in parallel, a signal from the capacitor element and the electric signal from the pixel; and correcting the electric signal based on the signal from the capacitor element.

According to the invention, there is provided a recording medium of a readable program for operating a computer to execute a controlling method of a radiation imaging apparatus comprising: a conversion unit having a pixel region in which a plurality of pixels each having a conversion element for converting a radiation into an electric charge and a switching element for outputting an electric signal based on the electric charge are arranged in a matrix; a capacitor element arranged outside of the pixel region; and a reading out circuit unit for reading out the electric signals from the pixels row by row, wherein the program operates the computer to execute steps of: reading out by the reading out circuit unit, in parallel, a signal from the capacitor element and the electric signal from the pixel; and correcting the electric signal based on the signal from the capacitor element.

Since the signal from the capacitor element has a line noise component, by correcting the electric signal based on the signal from the capacitor element obtained in parallel with the signal from the pixel, the line noise in the image can be easily and properly removed. Since the capacitor element arranged outside of the pixel region is used, different from the case of using a dark portion output of the pixel, the influence of noise due to a dark current of the pixel or a fixed pattern noise due to thermal noise, a lattice defect, or the like can be prevented.

Further features of the present invention will become apparent from the following description of exemplary embodiments with reference to the attached drawings.

DESCRIPTION OF THE EMBODIMENTS

First Embodiment

Figure 7:
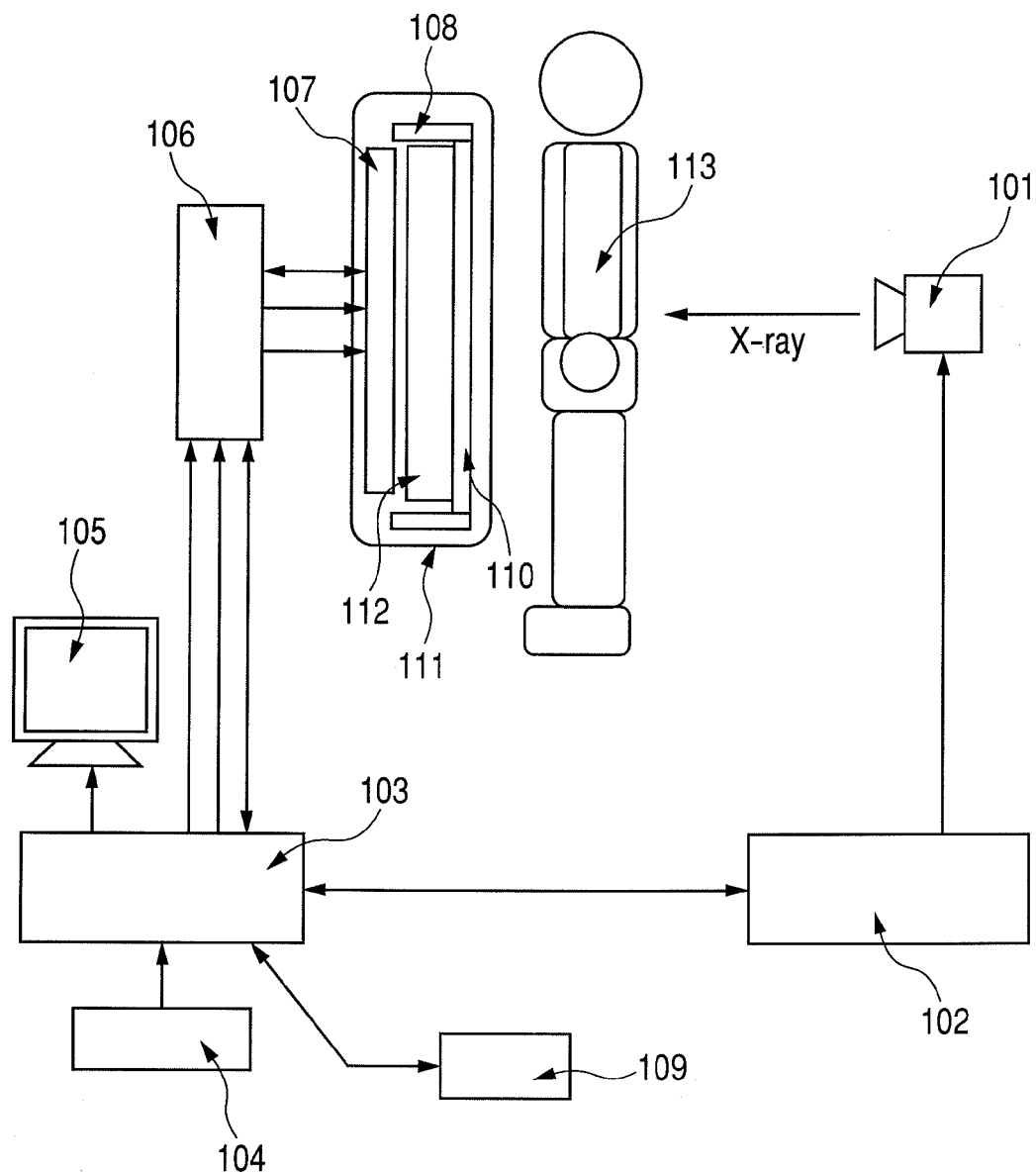
FIG. 7 is a schematic constructional diagram of a radiation imaging system using the radiation imaging apparatus of the invention.

First, a radiation imaging system using a radiation imaging apparatus of the invention will be described with reference to FIG. 7. FIG. 7 is a schematic constructional diagram of the radiation imaging system using the radiation imaging apparatus of the invention. In the invention, it is assumed that besides beams of α-particles, β-particles, and γ-rays, and the like as beams which are formed by particles (including photons), which are radiated by a radiation decay, beams having energies of levels which are equal to or larger than those of such beams, for example, an X-ray beam, corpuscular rays, cosmic rays, and the like are also included within the term "radiation". In the embodiment, a description will be made by using an X-ray imaging apparatus using X-rays as the incident radiation.

A construction of a typical digital radiation imaging system is illustrated in FIG. 7. A part of the X-ray beam radiated from an X-ray source 101 is absorbed by an object (object to be photographed) 113. The X-rays that have been transmitted through the object 113 arrive at and irradiate an X-ray imaging apparatus 111. The X-ray imaging apparatus 111 converts the received X-rays into an electric signal by a sensor array 110, is driven by a driving circuit unit 112, and outputs the electric signal to a reading out circuit unit 108 row by row. The electric signal input to the reading out circuit unit 108 is amplified by an operation amplifier provided in the reading out circuit unit 108 and, thereafter, converted into a digital signal by an A/D converter provided in a system circuit unit 107. The converted digital signal is transmitted to a processing circuit unit 106 from the system circuit unit 107. The transmitted digital signal is image processed by one of the processing circuit unit 106 and a control PC 103. The image processed digital signal is used to display the image onto a monitor 105 or stored into a memory. The control PC 103 transmits control signals to the processing circuit unit 106 in order to control the reading out circuit unit 108, driving circuit unit 112, and sensor array 110 provided in the X-ray imaging apparatus 111. The processing circuit unit 106 controls the system circuit unit 107, reading out circuit unit 108, and driving circuit unit 112 based on the control signals. Operating voltages and a reference voltage are supplied from a power source unit 109 to the sensor array 110, driving circuit unit 112, reading out circuit unit 108, and the system circuit unit 107 provided in the X-ray imaging apparatus 111 through the control PC 103 and the processing circuit unit 106, respectively. The control PC 103 also controls the irradiation of the X-rays from the X-ray source through an X-ray control apparatus 102. Various kinds of information are input to the control PC 103 from a control panel 104. The control PC 103 makes various kinds of control based on the input information.

Figure 1:
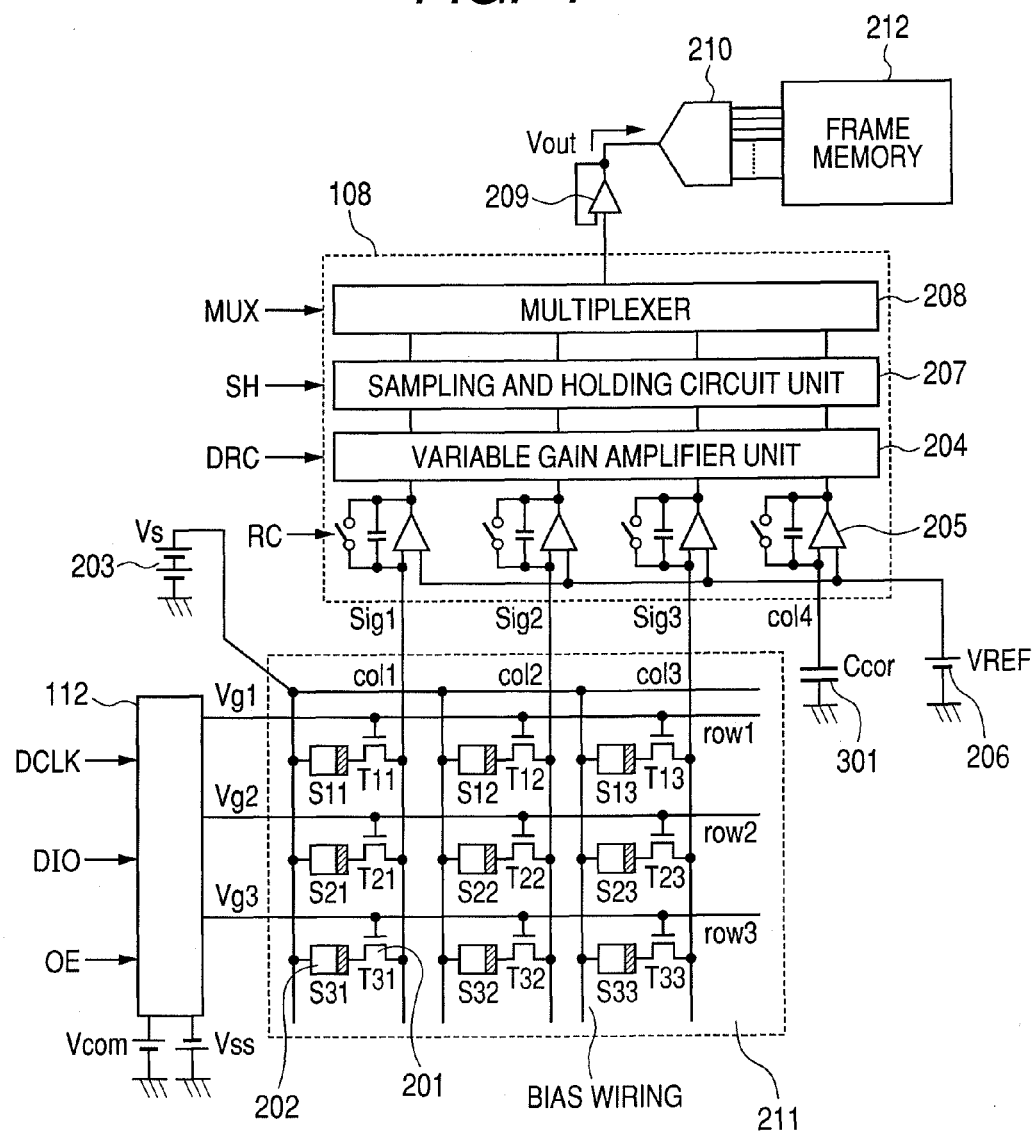
FIG. 1 is a schematic equivalent circuit diagram of a radiation imaging apparatus in the first embodiment of the invention.

Subsequently, a circuit construction of the radiation imaging apparatus in the first embodiment of the invention will be described with reference to FIG. 1. FIG. 1 is a schematic equivalent circuit diagram of the radiation imaging apparatus of the embodiment and corresponds to the X-ray imaging apparatus 111 in FIG. 7.

The sensor array has a pixel region 211 in which a plurality of pixels each having a conversion element 202 for converting the radiation into an electric charge and a switching element 201 for outputting an electric signal based on the converted electric charge are arranged in a matrix. In the embodiment, a wavelength converter for converting the radiation into light and a photoelectric conversion element for converting the light into an electric charge are used as a conversion element 202. A TFT of amorphous silicon is used as a switching element 201. Driving wirings Vg1 to Vg3 are connected in common to the switching elements of a plurality of pixels arranged along a row and a plurality of driving wirings are arranged along a column. Signal wirings Sig1 to Sig3 are connected in common to the switching elements of a plurality of pixels arranged along the column and a plurality of signal wirings are arranged along the row. A bias wiring for applying a bias adapted to enable the conversion element 202 to convert the radiation or light into the electric charge is connected in common to the conversion element 202 of each pixel. The sensor array (conversion unit) is constructed by having those component elements. In the sensor array, the switching elements 201 and conversion elements 202 are formed on an insulating substrate such as glass or the like by using an amorphous silicon process.

The driving circuit unit 112 for outputting driving signals having enabling voltages for enabling the switching elements 201 to the switching elements 201 is connected to the driving wirings Vg1 to Vg3, respectively. The driving circuit unit 112 outputs the driving signals formed by input voltage (enabling voltage and disabling voltage) values from two power sources according to pulses (DCLK, OE, DIO) which have been input. The driving circuit unit 112 sequentially supplies the driving signals to a plurality of driving wirings Vg1 to Vg3 arranged along the column, thereby allowing the switching elements 201 to output the electric signals from the pixels to the signal wirings Sig1 to Sig3 row by row. The reading out circuit unit 108 for reading out the electric signals from the pixels in parallel row by row is connected to the signal wirings Sig1 to Sig3. A sensor power source 203 for applying a bias (Vs) for enabling the conversion element 202 to convert the radiation or light into the electric charge is electrically connected to the bias wiring. As for the sensor power source 203, a magnitude and a polarity of a voltage value which is used, the number of power sources, and the like differ depending on a structure of the conversion element 202 and a converting method and the conversion elements 202 are properly selected so that a sufficient S/N ratio can be obtained.

In the reading out circuit unit 108, an operation amplifier 205 of an integrating type is electrically connected to each signal wiring in a one-to-one correspondence relational manner. In the operation amplifier 205 of the integrating type, its amplification factor can be changed by changing the number of capacitors connected to a feedback unit of the amplifier and their capacitances. A reference power source (VREF) 206 is electrically connected to the operation amplifier 205 and a reference voltage is supplied thereto from the reference power source. The operation amplifier 205 outputs a voltage which is proportional to an electric charge amount integrated by using the reference voltage as a reference. Further, a variable gain amplifier unit 204 having amplifiers, each of which amplifies the signal from the operation amplifier 205 and whose amplification factor can be changed, provided for each of the signal wirings Sig1 to Sig3, is connected at a stage following to the operation amplifier 205 of the integrating type. A sampling and holding circuit unit 207 in which sampling and holding circuits (hereinbelow, also referred to as S/H circuits) for temporarily holding the output signals are provided for each of the signal wirings Sig1 to Sig3 is connected at a stage following to the variable gain amplifier unit 204.

The amplifiers which are used in the variable gain amplifier unit 204 have substantially the same circuit construction as that of the operation amplifier 205, and their amplification factors can be changed by changing the number of capacitors and their capacitances in a manner similar to that in the operation amplifier 205 Further, correlated double sampling is executed by shifting reset timing for the operation amplifier 205 and reset timing for the variable gain amplifier unit 204 and the noise which is caused in the operation amplifier 205 can be cancelled. Although not shown, the S/H circuit unit 207 has a set of a transfer switch and a holding capacitor for each of the signal wirings Sig1 to Sig3. By collecting a plurality of sets, the S/H circuit unit 207 is constructed.

One set including the operation amplifier 205, the amplifier of the variable gain amplifier unit 204, and the transfer switch and the holding capacitor of the S/H circuit unit 207 is provided in correspondence to one signal wiring. In the specification, one set including the operation amplifier 205, the amplifier of the variable gain amplifier unit 204, and the transfer switch and the holding capacitor of the S/H circuit unit 207 which are connected to the signal wiring is called a channel (first reading out circuit). The operation amplifier 205 provided for the channel for reading out the signal from the sensor array is called a first operation amplifier. A multiplexer 208 for converting the signals which have been read out of the pixels in parallel row by row through a plurality of channels into a serial signal and reading out the serial signal is provided for the reading out circuit unit 108. By such a construction, the reading out circuit unit 108 sequentially converts the parallel signals read out of the sensor array row by row into the serial signal.

In the embodiment, separately from the channel for reading out the signals from the pixel region 211 of the sensor array in which a plurality of pixels are arranged in a matrix, a correction channel (second reading out circuit) is provided in order to read out a signal for correcting the line noise. A capacitor element (correction element) 301 which is provided outside of the pixel region (external region of the pixel region 211) and is used to obtain the signal for correcting the line noise is connected to the correction channel.

Although not illustrated in FIG. 1, the capacitor element 301 for correcting the line noise may be formed on an insulating substrate such as a glass substrate or the like and outside of the pixel region 211 of the sensor array. In this instance, the capacitor element 301 may be formed on the switching element 201 from the same layer as that of amorphous silicon nitride film which is used as an insulating layer or from the same layer as that of aluminum or the like which is used as an electrode. The capacitor element 301 may be formed from the same layer as the layer which is used for the conversion element 202. The capacitor element 301 may be formed in a crystalline semiconductor chip constructing the reading out circuit unit 108 from the same layer as a silicon oxide film which is used as an insulating layer in another operation amplifier 205, the holding capacitor of the S/H circuit unit 207, or the like or from the same layer of aluminum or the like which is used a wiring.

As illustrated in FIG. 1, one electrode of the capacitor element 301 is electrically connected to an input of the operation amplifier 205 which is used for the correction channel. The other electrode of the capacitor element 301 is electrically connected to a reference power source for applying a reference voltage (grounding potential) to the operation amplifier 205. In the specification, the operation amplifier 205 which is used for the correction channel is called a second operation amplifier.

By such a construction, a fluctuation in the reference power source 206 for applying the reference voltage to the operation amplifier 205 and a fluctuation in the reference potential (grounding potential) which are one of the main factors of the line noise are detected by the capacitor element 301 for correcting the line noise. The reference voltage is input to the operation amplifier 205 of the correction channel connected to the capacitor element 301 and is simultaneously read out when the other channel reads out the electric signal from the sensor array, so that the fluctuations in the reference power source and reference potential which become the main factor of the line noise are obtained.

The fluctuations in the reference power source 206 and reference voltage are amplified by a ratio (that is, Ccor/Cf) between a capacitance Ccor of the capacitor element 301 and a feedback capacitance Cf of the operation amplifier 205 of the correction channel. Therefore, it is desirable that the capacitance value of the capacitor element 301 for correcting the line noise is set to a value which is equal to or larger than a parasitic capacitance of the signal wirings Sig1 to Sig3 of the sensor array.

Figure 4:
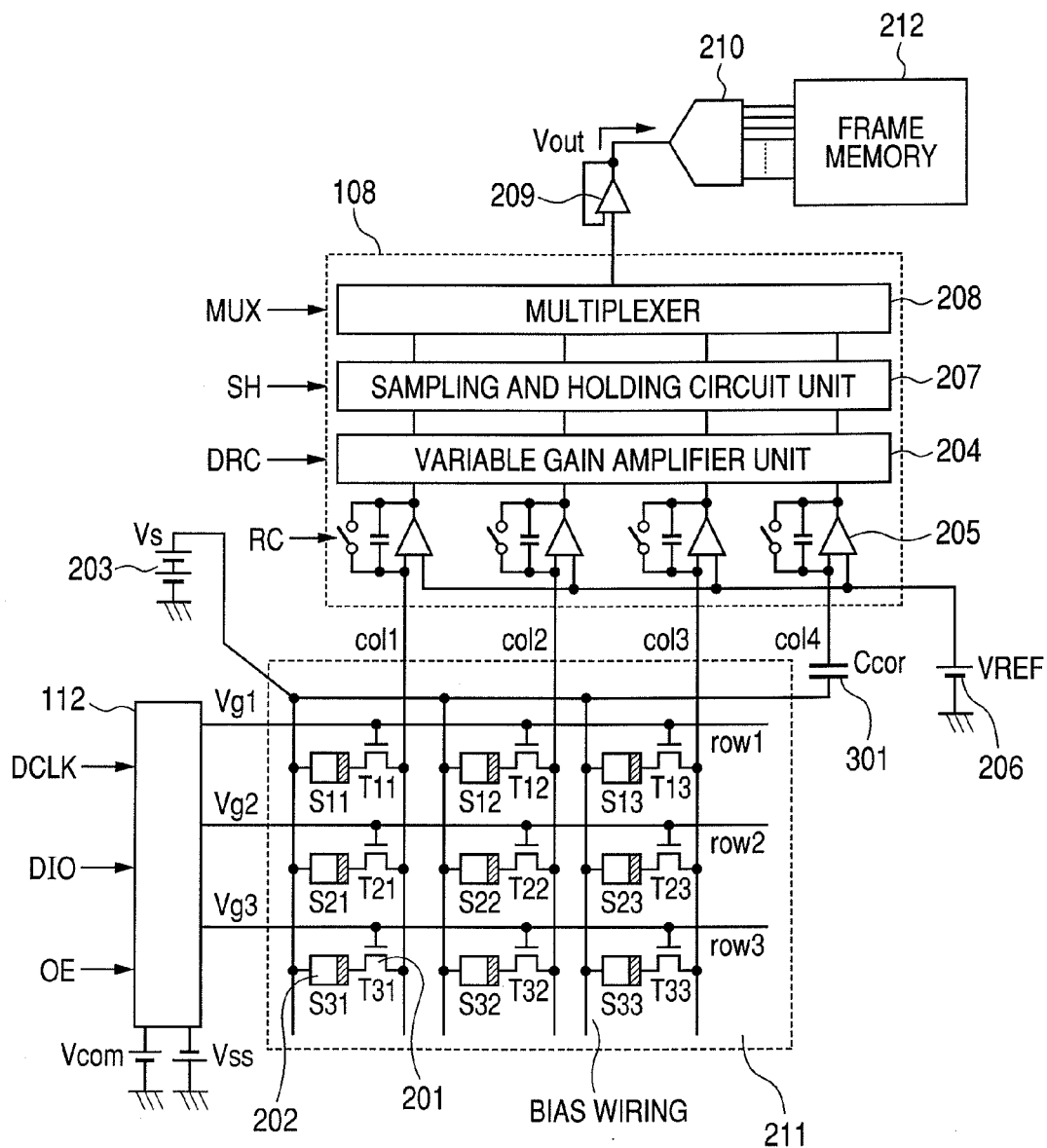
FIG. 4 is a schematic equivalent circuit diagram of another radiation imaging apparatus in the first embodiment of the invention.

The voltage which is applied to the other electrode of the capacitor element 301 is not limited to the voltage which is supplied from the reference power source 206 connected to the operation amplifier 205 mentioned above. For example, the other electrode of the capacitor element 301 may be connected to the sensor power source 203 as illustrated in FIG. 4. The sensor power source 203 is capacitively coupled with the signal wirings Sig1 to Sig3 through the pixels. Through the signal wirings Sig1 to Sig3, the fluctuation in the sensor power source 203 is input to all channels connected to the sensor array through the signal wirings Sig1 to Sig3. Therefore, a fluctuation in the bias which is supplied from the sensor power source 203 also causes the line noise. By connecting the input of the operation amplifier 205 of the correction channel to the sensor power source 203 through the capacitor element 301 as illustrated in FIG. 4, the fluctuation in the bias which is supplied from the sensor power source 203 can be fetched simultaneously with the fetching of the image. It is desirable that the capacitance value of the capacitor element 301 in FIG. 4 is set to a value which is equal to or larger than a capacitance coupling amount of the signal wirings Sig1 to Sig3 and the bias wiring.

Figure 5:
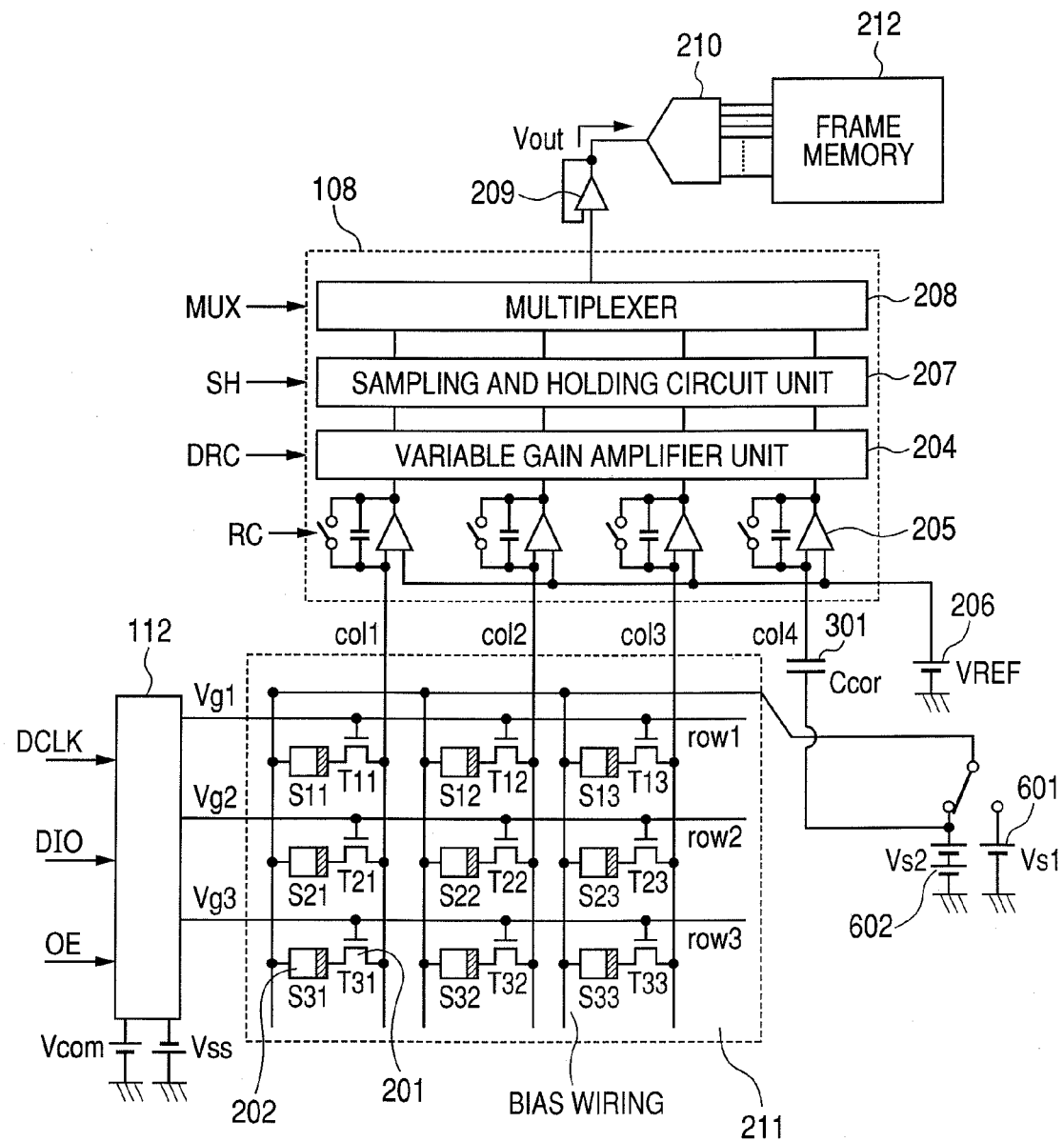
FIG. 5 is a schematic equivalent circuit diagram of still another radiation imaging apparatus in the first embodiment of the invention.

Although FIG. 5 illustrates a construction in which a sensor power source 602 is connected to the other electrode of the capacitor element 301 in a manner similar to FIG. 4, it differs from FIG. 4 with respect to a point that the sensor power source is constructed by a plurality of sensor power sources 601 and 602. In the case of such a construction using the sensor power sources, it is desirable that the sensor power source 602 for supplying a voltage to the conversion element 202 at the time of the accumulating operation, which will be described hereinafter, is connected to the other electrode of the capacitor element 301.

The multiplexer 208 for time-sequentially reading out the electric signals accumulated in a holding capacitor of the S/H circuit unit 207 is provided at a stage following to the S/H circuit unit 207. An analog serial signal read out of the multiplexer 208 is sequentially transferred to an A/D converter 210 through a buffer amplifier 209.

The A/D converter 210 converts the analog signal which is output from the buffer amplifier 209 into a digital signal. The digital signal output from the A/D converter 210 is stored as image data into a frame memory 212. In this manner, the digital image data corresponding to one image (frame) can be obtained from the radiation imaging apparatus.

An indirect type conversion element in which a photoelectric conversion element for converting light in a wavelength band which can be perceived into an electric charge and a wavelength converter for converting radiation into light in a wavelength band which can be perceived by the photoelectric conversion element are combined is used as a conversion element 202 of the embodiment. However, the invention is not limited to such an indirect type conversion element, but a direct type conversion element for directly converting a radiation into an electric charge may be used. As an indirect type conversion element, an MIS (Metal-Insulator-Semiconductor) type photoelectric conversion element or a PIN type photoelectric conversion element is desirably used. As a direct type conversion element, a material containing any one of amorphous selenium, GaAs, $HgI_2$, $PbI_2$, CdTe, and ZnS as a main component is used.

Figure 6A:
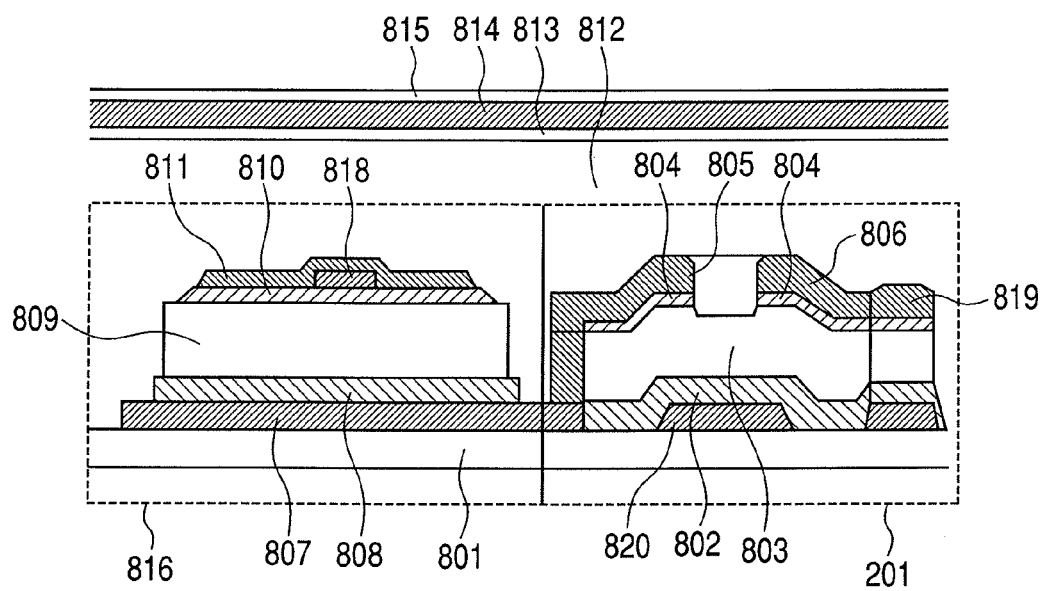
FIGS. 6A and 6B are schematic cross-sectional views of a pixel using a photoelectric conversion element which is desirably used for a conversion element of the radiation imaging apparatus of the invention.

FIG. 6A illustrates a schematic cross sectional view of a pixel using the MIS type photoelectric conversion element which is desirably used for the conversion element of the radiation imaging apparatus of the invention. As illustrated in FIG. 6A, a TFT which is used as a switching element 201 is formed on an insulating substrate 801 such as a glass substrate. A driving wiring and a gate electrode 820 are formed by using aluminum or an alloy containing aluminum. A gate insulating film 802 is formed by an amorphous silicon nitride film. A semiconductor layer 803 serving as a channel of the TFT is made of amorphous silicon hydride (a-Si:H). An impurity semiconductor layer 804 is made of amorphous silicon in which N type impurities have been doped and is a layer for making an ohmic contact between the semiconductor layer 803 and a source electrode layer 805/drain electrode layer 806, which will be described hereinafter. The source electrode layer 805 and the drain electrode layer 806 are formed from the same conductive layer and made of a metal such as aluminum or an alloy of aluminum.

A lower electrode (first electrode) 807 of an MIS type photoelectric conversion element 816 is made of a metal such as chromium, aluminum, or an alloy of aluminum or the like formed on the insulating substrate 801. An insulating layer 808 serving as an insulating layer of the MIS type photoelectric conversion element 816 is made of an amorphous silicon nitride film. A semiconductor layer 809 serving as a photoelectric conversion element for converting visible light into an electric signal is made of amorphous silicon hydride. An impurity semiconductor layer 810 is made of amorphous silicon in which N type impurities have been doped and is a layer for making an ohmic contact between the semiconductor layer 809 and an upper electrode 811, which will be described hereinafter. The impurity semiconductor layer 810 has a function for blocking that holes are doped from a bias wiring 818. The upper electrode (second electrode) 811 is used to supply a bias to the MIS type photoelectric conversion element 816 and is formed by a transparent conductive layer made of ITO or the like. The bias wiring 818 is made of a metal material such as aluminum or chromium which is used as a well-known wiring material.

A protecting layer 812 is a layer to protect the photoelectric conversion element 816 and the TFT 201 against moisture in the open air or a foreign matter from phosphor 814 and is formed by an inorganic insulating layer such as silicon nitride film or silicon oxide film. A moisture barrier layer 813 is a layer to protect the phosphor 814 and the sensor array against the moisture in the open air and is formed by an inorganic insulating layer such as silicon nitride film or silicon oxide film or by an organic insulating layer such as polyimide. As phosphor 814 as a wavelength converter for converting a radiation into visible light, for example, a material of a gadolinium system such as $Gd_2O_2S$ or $Gd_2O_3$ or a material such as CsI (cesium iodide) is used. A phosphor protecting layer 815 is a layer to protect the phosphor 814 against the moisture in the open air or a shock from the outside.

Figure 6B:
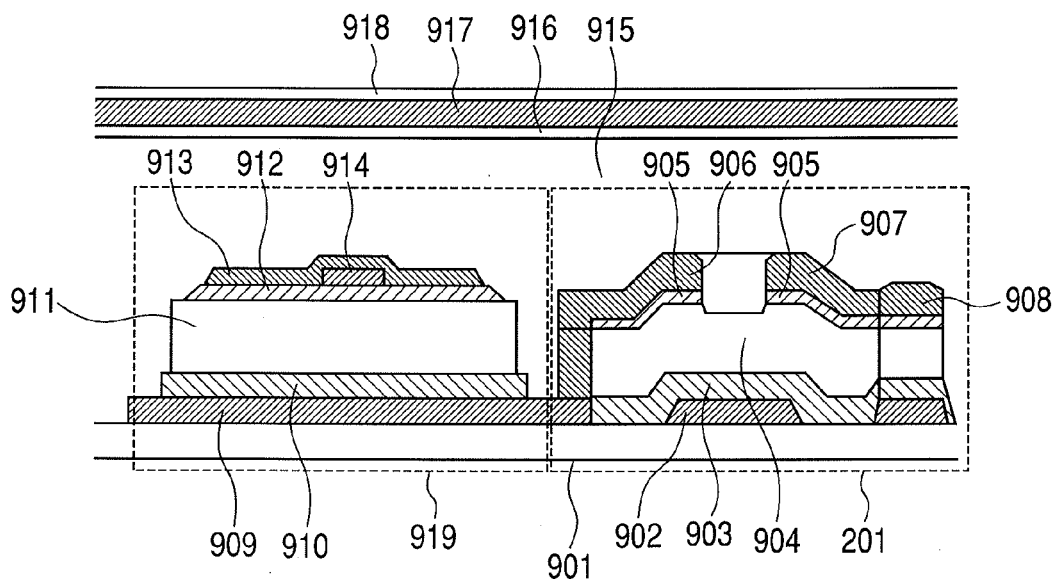

FIG. 6B illustrates a schematic cross-sectional view of a pixel using the PIN type photoelectric conversion element which is desirably used for the conversion element of the radiation imaging apparatus of the invention. The TFT which is used as a switching element 201 is formed on an insulating substrate 901 such as a glass substrate. A driving wiring and a gate electrode 902 are formed by using aluminum or an alloy containing aluminum. A gate insulating film 903 is formed by an amorphous silicon nitride film. A semiconductor layer 904 serving as a channel of the TFT is made of amorphous silicon hydride (a-Si:H). An impurity semiconductor layer 905 is made of amorphous silicon in which N type impurities have been doped and is a layer for making an ohmic contact between the semiconductor layer 904 and a source electrode layer 906 and a drain electrode layer 907, which will be described hereinafter. The source electrode layer 906 and the drain electrode layer 907 are formed from the same conductive layer and made of a metal such as aluminum or an alloy containing aluminum.

A lower electrode (first electrode) 909 of a PIN type photoelectric conversion element 919 is made of a metal such as aluminum or an alloy containing aluminum formed on the insulating substrate 901. A first impurity semiconductor layer 910 is made of amorphous silicon in which N-type (first conductivity type) impurities have been doped and is a layer to prevent holes from being doped into a semiconductor layer 911 from the lower electrode 909. The semiconductor layer 911 serving as a photoelectric conversion layer for converting the visible light into an electric signal is made of amorphous silicon hydride. A second impurity semiconductor layer 912 is made of amorphous silicon in which impurities of a P-type (second conductivity type) as a conductivity type opposite to the N-type (first conductivity type) have been doped. The second impurity semiconductor layer 912 has a function for making an ohmic contact between the semiconductor layer 911 and an upper electrode 913 and blocking that electrons are doped from a bias wiring 914. The upper electrode (second electrode) 913 is used to supply a bias to the PIN type photoelectric conversion element 919 and is formed by a transparent conductive layer made of ITO or the like. The bias wiring 914 is made of a metal material such as aluminum or chromium which is used as a well-known wiring material.

A protecting layer 915 is a layer to protect the photoelectric conversion element 919 and the TFT 201 against the moisture in the open air or a foreign matter from phosphor 917 and is formed by an inorganic insulating layer such as silicon nitride film or silicon oxide film. A moisture barrier layer 916 is a layer to protect the phosphor 917 and the sensor array against the moisture in the open air and is formed by an inorganic insulating layer such as silicon nitride film or silicon oxide film or by an organic insulating layer such as polyimide. As a material of the phosphor 917 as a wavelength converter for converting radiation into visible light, for example, a material of a gadolinium system or a material such as CsI (cesium iodide) is used. A phosphor protecting layer 918 is a layer to protect the phosphor 917 against the moisture in the open air or a shock from the outside.

As already mentioned before, the capacitor element 301 may be formed on the insulating substrate simultaneously with the photoelectric conversion element 202 and TFT 201. In this instance, it is desirable that the capacitor element 301 is formed simultaneously with the timing when the gate insulating films, gate electrodes, and signal wirings illustrated in FIGS. 6A and 6B are formed and the layer constructions and the film thicknesses are also similarly set. The invention is not limited to such a construction but the capacitor element 301 may be formed in a crystalline semiconductor IC constructing the reading out circuit unit 108 from the same layer as that of the silicon oxide film which is used as an insulating layer in the operation amplifier 205, the holding capacitor of the S/H circuit unit 207, or the like or from the same layer as that of aluminum or the like which is used as a wiring.

Figure 2:
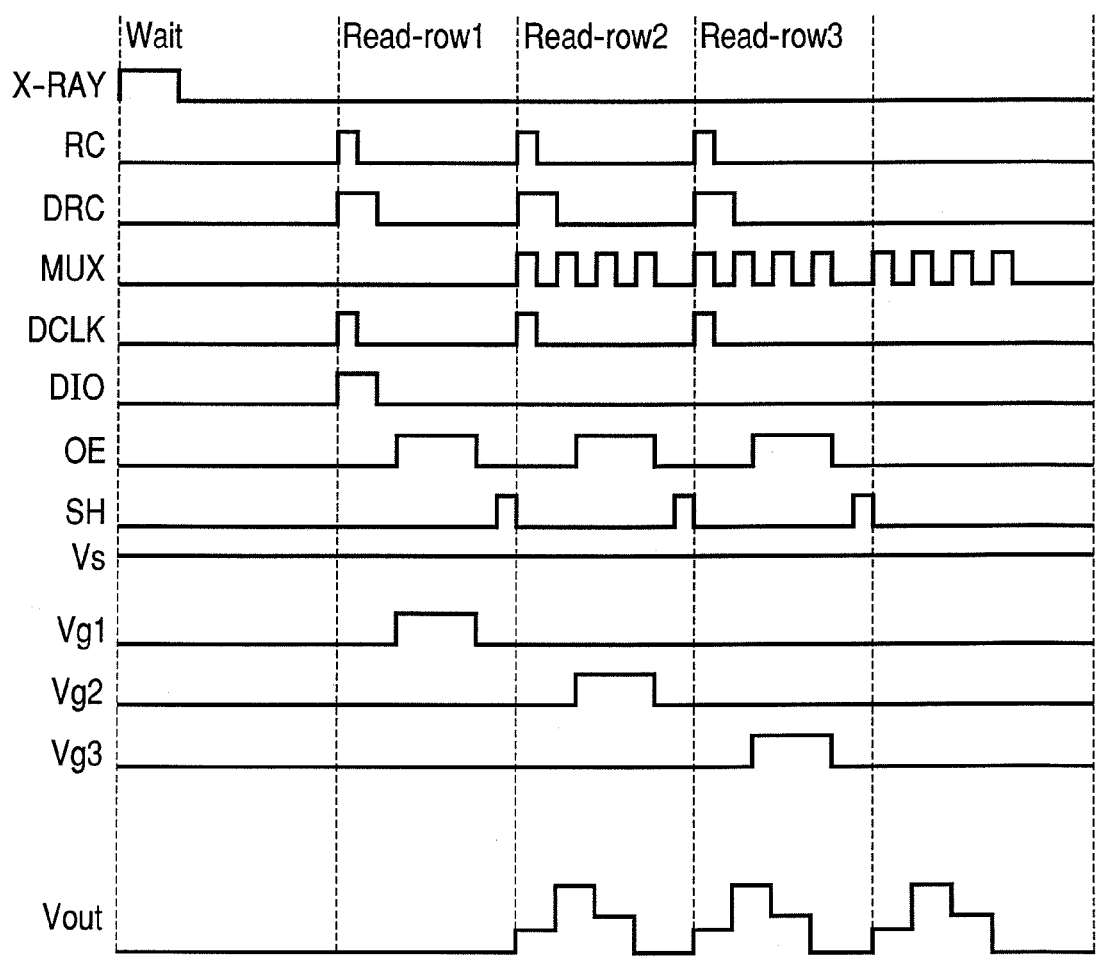
FIG. 2 is a timing chart for driving a sensor array which is used in the radiation imaging apparatus of the invention and obtaining a radiation image.

Subsequently, a driving method for obtaining a radiation image by using the radiation imaging apparatus of the invention will be described with reference to FIG. 2. FIG. 2 shows a timing chart for driving the sensor array which is used in the radiation imaging apparatus of the invention and obtaining the radiation image. When a signal X-RAY is set to the high level, the X-ray source 101 (FIG. 7) irradiates an X-ray beam. A signal RC is a control signal for resetting a feedback capacitor of the operation amplifier 205 and the signal wiring and is input to a reset switch of the operation amplifier 205. A signal DRC is a control signal which is input to the variable gain amplifier unit 204. A signal MUX is a control signal which is input to the multiplexer 208 and is used to specify operation timing for the multiplexer. Signals DCLK, CIO, and OE are control signals which are input to the driving circuit unit 112 and are used to specify operation timing for the driving circuit unit 112. A signal SH is a control signal which is input to the S/H circuit unit 207 and is used to specify sampling and holding timing. Those control signals are supplied from the processing circuit unit 106 or the system circuit unit 107 in FIG. 7. A signal Vout is an output signal from the buffer amplifier 209 in FIG. 1.

First, the bias (Vs) necessary for the conversion element 202 is supplied from the sensor power source 203 and the switching element 201 is disabled. Such an operation of the sensor array is called an accumulating operation Wait. By irradiating the X-rays by means of the signal X-RAY while the sensor array is executing the accumulating operation Wait, the electric charges based on information of the X-rays which have transited through the object are accumulated in the conversion element 202.

Subsequently, the electric signal based on the electric charges accumulated in the conversion element 202 is input to the reading out circuit unit 108. Such a reading operation is called "Read". In the reading operation Read-row1 of the first row, first, the control signals RC and DRC are set to Hi (high level) and an input and an output of the operation amplifier 205 and variable gain amplifier unit 204 of each channel are short-circuited, thereby resetting the operation amplifier 205 and the variable gain amplifier unit 204. By executing the resetting operation prior to outputting the signal from the conversion element 202, the unnecessary signals which have been input to the operation amplifier 205 and variable gain amplifier unit 204 are erased during the accumulating operation, so that the picture quality is improved.

At this time, the control signals DCLK and DIO are input to the driving circuit unit 112, thereby enabling Vcom (enabling voltage) as a voltage for enabling the switching elements 201 to be supplied to the driving wirings Vg1 to Vg3 simultaneously with that the control signal OE is set to Hi (high level). The control signal RC is set to Lo (low level) and the resetting of the operation amplifier 205 is finished. Subsequently, after the lapse of a proper time, the signal DRC is switched from Hi to Lo and the resetting of the variable gain amplifier unit 204 is finished.

Subsequently, the control signal OE is set to Hi in order to enable the switching element 201 of the first row (row1). Simultaneously with that the control signal OE is set to Hi, the voltage of the driving wiring Vg1 of the first row (row1) is switched from Vss (disabling voltage) to Vcom (enabling voltage) and switching elements T11 to T13 of the first row are enabled. Thus, electric signals based on the electric charges accumulated in conversion elements S11 to S13 of the pixels of the first row are output to the operation amplifiers 205 through the switching elements T11 to T13 and the signal wirings Sig1 to Sig3. At this time, an electric signal based on the electric charge accumulated in the capacitor element 301 is also read out by the operation amplifier 205 of the correction channel of the reading out circuit unit 108 for the same period of time as that during which the electric signals of the pixels are output. In other words, the electric signal based on the electric charge in the capacitor element 301 is output in parallel with the electric signals from the pixels and derived by the operation amplifier 205 of the correction channel of the reading out circuit unit 108.

After the switching elements T11 to T13 were enabled for a time enough to transfer the electric signals based on the electric charges accumulated in the conversion elements S11 to S13, the signal OE is set to Lo and the switching elements T11 to T13 are disabled. At a point of time when the switching elements T11 to T13 are disabled, the electric signals (voltages) according to the electric charges accumulated in the conversion elements S11 to S13 are output as output signals of the variable gain amplifier unit 204.

After the elapse of a proper time after the switching elements T11 to T13 of the first row had been disabled, the control signal SH is set to Hi, thereby allowing the output of the variable gain amplifier unit 204 of each channel to be sampled and held in the holding capacitor of each channel in the S/H circuit unit 207. After the sampling and holding operations have been finished by setting the control signal SH to Lo, a reading operation Read-row2 of the second row (row2) is similarly executed.

At this time, the control signal MUX is input to the multiplexer 208 in parallel with the resetting of the operation amplifier 205 in the reading operation of the second row or the switching of the enabling/disabling operations of switching elements T21 to T23. Thus, the signals held in the holding capacitor in the S/H circuit unit 207 of each channel are time-sequentially read out, and a serial signal is output. The analog serial signal output from the multiplexer 208 is sent to the A/D converter 210 through the buffer amplifier 209. The A/D converter 210 converts the analog serial signal into a digital signal and transmits the digital signal to the frame memory 212.

In the reading operation Read-row2 of the second row, by controlling the driving wiring Vg2 in a manner similar to the reading operation of the first row, the switching elements T21 to T23 are enabled. Thus, electric signals based on the electric charges accumulated in conversion elements S21 to S23 are output to the operation amplifiers 205 through the switching elements T21 to T23 and the signal wirings Sig1 to Sig3. At this time, in a manner similar to the reading operation of the first row, the electric signal based on the electric charge in the capacitor element 301 is also read out by the operation amplifier 205 of the correction channel of the reading out circuit unit 108 for the same period of time as that during which the electric signals of the pixels are output. Further, after the signals of the pixels of the second row were sampled and held, a reading operation Read-row3 of the third row is similarly executed. In the reading operation Read-row3, by controlling the driving wiring Vg3 in a manner similar to the reading operation of the first or second row, switching elements T31 to T33 are enabled. Thus, electric signals based on the electric charges in conversion elements S31 to S33 are output to the operation amplifiers 205 through the switching elements T31 to T33 and the signal wirings Sig1 to Sig3. At this time, in a manner similar to the reading operation of the first or second row, the electric signal based on the electric charge in the capacitor element 301 is also read out by the operation amplifier 205 of the correction channel of the reading out circuit unit 108 for the same period of time as that during which the electric signals of the pixels are output. In this manner, in order to read out the electric signals from the pixels of the second and third rows, it is sufficient to execute the operations within a range from the control signal RC=Hi to the control signal SH=Lo. As illustrated in FIG. 2, by repetitively executing the reading operation with respect to the three rows, the data of one X-ray image and the correction data can be obtained. In this manner, the correction channel to which the capacitor element 301 is connected reads out the electric signal from the capacitor element 301 during substantially the same reading operation as that of the channel to which the signal wirings Sig1 to Sig3 are connected. Thus, the electric signal corresponding to the line noise component which is generated for a period of time from the end of the resetting of the operation amplifier 205 to the end of the sampling and holding operations can be sampled and held into the holding capacitor of the correction channel of the S/H circuit unit 207. The sampled and held electric signal corresponding to the line noise component is output by the multiplexer in a manner similar to the electric signal from the channel connected to the sensor array. After that, output electric signal is converted into a digital signal by the A/D converter 210 and the digital signal is stored into the frame memory 212, so that the data for correction can be obtained within the same period as that of the data of one X-ray image.

Figure 3:
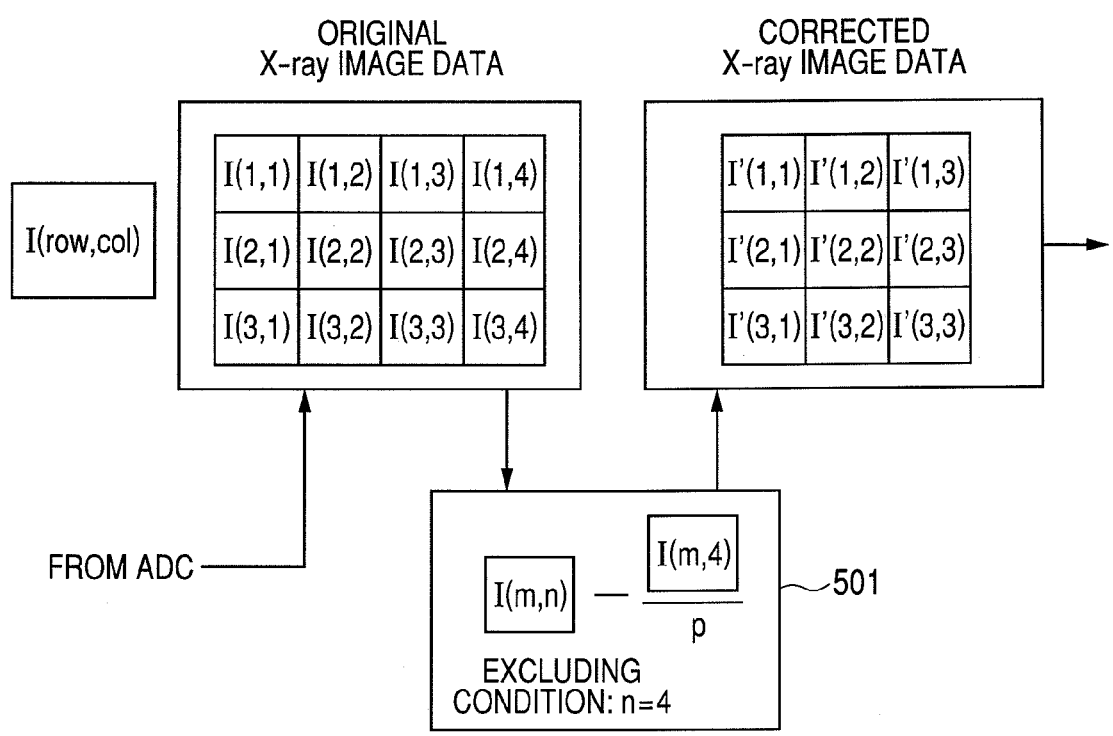
FIG. 3 is a conceptual diagram illustrating a correcting method of a line noise in the first embodiment of the invention.

Now, a correcting method of the line noise in the embodiment will be described with reference to FIG. 3. FIG. 3 is a conceptual diagram illustrating the correcting method of the line noise in the first embodiment of the invention. In FIG. 3, the X-ray image data obtained by the driving method already mentioned above is schematically illustrated in the frame memory 212. Information from the pixel of the first row row1 and the first column col1 (T11 and S11 in FIG. 1) is illustrated as I(1, 1).

As illustrated in FIG. 3, the fetched data is constructed by: data I(1, 1) to I(3, 3) of 3×3 X-ray images constructing the X-ray image information; and correction data I(1, 4) to I(3, 4) for correcting the line noise which has been output from the capacitor element 301.

The correction data I(1, 4) to I(3, 4) is data based on the signals which were obtained within the same period of time when the X-ray images are obtained and which were output from the correction channels to which the capacitor element 301 is connected. Therefore, the correction data I(1, 4) to I(3, 4) does not include the signal components corresponding to the image signal but signal components which are caused by the reference voltage that is supplied from the reference power source 206 and becomes a cause of the line noise or by a fluctuation such as a sensor bias which is supplied from the sensor power source 203 are contained. Assuming that a capacitance ratio p is equal to 1, a correction unit 501 for executing a correcting process of the line noise subtracts the X-ray image data I(m, n) in the frame memory 212 by using correction data I(m, 4) obtained in the same period of time as that of the X-ray image data I(m, n). By this method, the correction unit 501 corrects the line noise of the X-ray image data, obtains corrected X-ray image data I'(m, n), and writes it into the frame memory 212.

The capacitance ratio p will now be described. If the reference power source 206 of the operation amplifier 205 is connected to the other electrode of the capacitor element 301 as illustrated in FIG. 1, a ratio between the capacitance value of the capacitor element 301 and the parasitic capacitance value of the signal wirings Sig1 to Sig3 is assumed to be p. Therefore, the corrected X-ray image data I'(m, n) is obtained by the following equation:

$$I'(m,n)=I(m,n)-I(m,4)/p$$

where the capacitance ratio p is a natural number. That is, if the capacitance value of the capacitor element 301 and the parasitic capacitance value of the signal wirings Sig1 to Sig3 are equal, it is sufficient to subtract the X-ray image data I(m, n) by using the correction data I(m, 4) obtained in the same period of time as that of the X-ray image data I(m, n).

If the sensor power source 203 is connected to the other electrode of the capacitor element 301 as illustrated in FIGS. 4 and 5, a ratio between the capacitance value of the capacitor element 301 and a capacitance value between the bias wiring and the signal wirings Sig1 to Sig3 is assumed to be p and is obtained by the above equation. That is, if the capacitance value of the capacitor element 301 and the capacitance value between the bias wiring and the signal wirings Sig1 to Sig3 are equal, it is sufficient to subtract the X-ray image data I(m, n) by using the correction data I(m, 4) obtained in the same period of time as that of the X-ray image data I(m, n). By such a process, the correction can be executed by using a component of an amount which is almost equal to that of the line noise component which is multiplexed to the X-ray image. After the above process was executed, the correction unit 501 corrects the line noise by the process and writes the corrected X-ray image data I'(m, n) into the frame memory 212.

In the embodiment, the number of pixels of the sensor array is not limited to 9 (=3×3) as a total number of pixels but the invention can be also realized even if it is equal to a pixel pitch necessary as a radiation imaging system or the number of pixels which is calculated from an imaging area. The number of capacitor elements 301 is not limited to 1. The number of correction channels connected to the capacitor element 301 is not limited to 1 but the system may have a plurality of correction channels. The number of driving circuit units 112 is not limited to 1. The number of switching elements 201 in the pixel is not limited to 1. That is, the number of pixels in the pixel region 211 of the sensor array, the number of reading out circuit units 108, the number of channels in the reading out circuit unit 108, the number of driving circuit units 112, and the number of switching elements 201 in one pixel are not limited to the numbers shown in the embodiment, respectively.

Each of the reading out circuit unit 108 and the driving circuit unit 112 in the invention may be constructed by a transistor formed on a monosilicon chip by using a photolithography, sputtering method, epitaxial growing method, or the like or by a transistor formed on an insulating substrate of an outer periphery of the pixel region 211 by a polysilicon process.

Although an example in which the processed data is stored into another area in the frame memory 212 in FIG. 3 has been shown in the embodiment, a method whereby the corrected X-ray image data is overwritten to the X-ray image data before processing and the correction data I(m, 4) is finally deleted may be used.

The power source connected to the other electrode of the capacitor element 301 is not limited to one kind but may be a combination of the reference power source 206 of the operation amplifier 205 and the sensor bias power source 203.

The correction unit 501 in the embodiment may be one of software which operates in a computer for executing the image processes of the radiation imaging system and a program which has been programmed in an LSI. In such a case, one of the processing circuit unit 106 and the control PC 103 in FIG. 7 executes a program stored in an internal storing apparatus, thereby executing the correcting process of the correction unit 501. Means for supplying the program to the computer, for example, a computer-readable recording medium such as a CD-ROM in which such a program has been recorded or a transmission medium such as Internet for transmitting such a program can be also applied as an embodiment of the invention. A computer program product such as a computer-readable recording medium in which the foregoing program has been recorded can be also applied as an embodiment of the invention. The foregoing program, recording medium, transmission medium, and computer program product are incorporated in the purview of the invention. As a recording medium, for example, a flexible disk, a hard disk, an optical disk, a magnetooptic disk, a CD-ROM, a magnetic tape, a non-volatile memory card, a ROM, or the like can be used.

Second Embodiment

Figure 8:
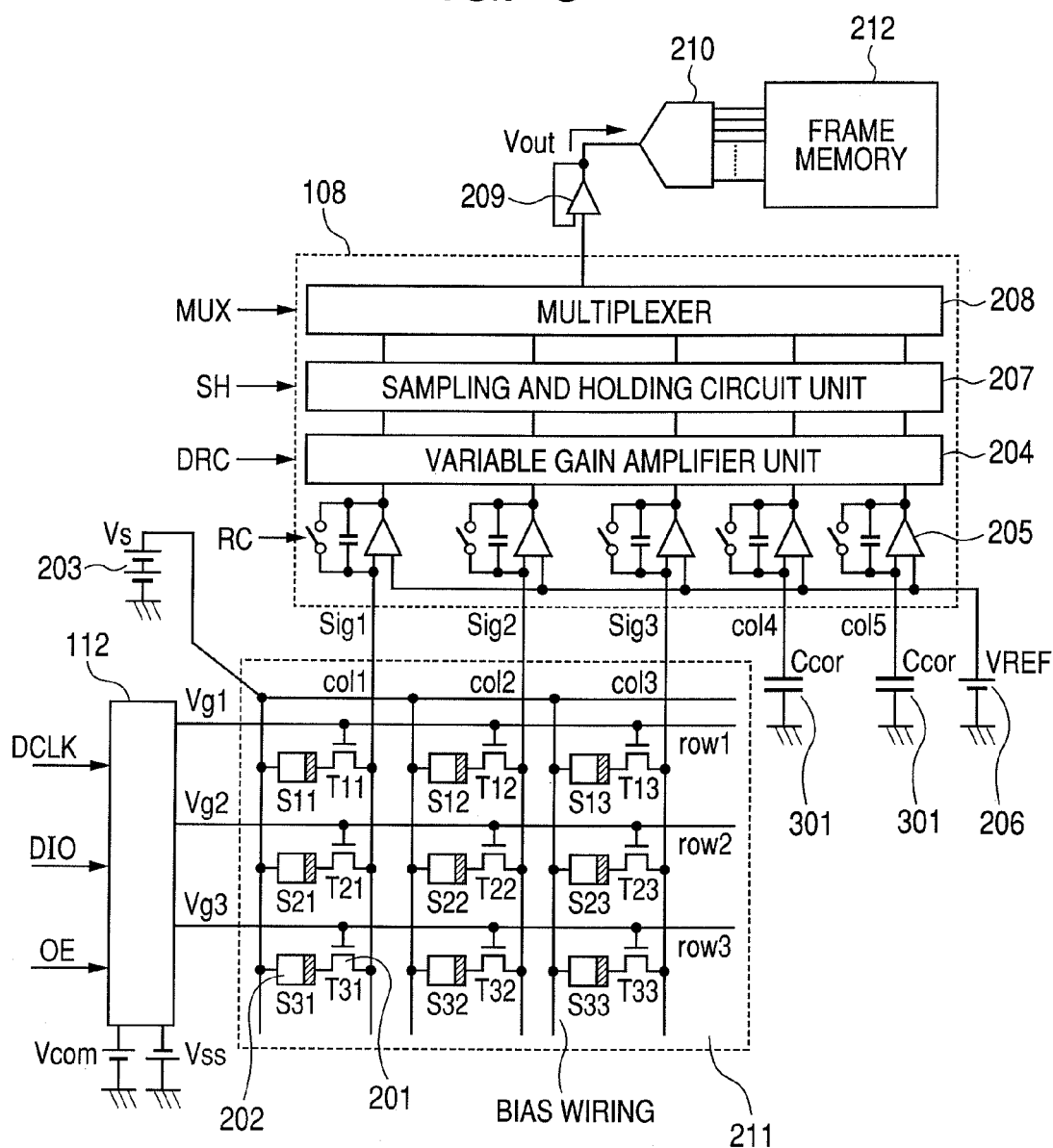
FIG. 8 is a schematic equivalent circuit diagram of a radiation imaging apparatus in the second embodiment of the invention.

A sensor array according to the second embodiment of the invention and a correcting process using the sensor array will now be described with reference to FIGS. 8 and 9. FIG. 8 is a schematic equivalent circuit diagram of a radiation imaging apparatus in the second embodiment of the invention. In the embodiment, the radiation imaging apparatus in which a plurality of capacitor elements 301 and a plurality of correction channels connected to the capacitor elements 301 described in the first embodiment are arranged will be described. Although an example in which two capacitor elements 301 and two correction channels are arranged is illustrated in FIG. 8 for convenience of description, the number of capacitor elements 301 and the number of correction channels are not limited to 2 but may be a plural number of 2 or more. Since other driving methods, functions, and the like are similar to those in the first embodiment, their detailed description is omitted here.

Figure 9:
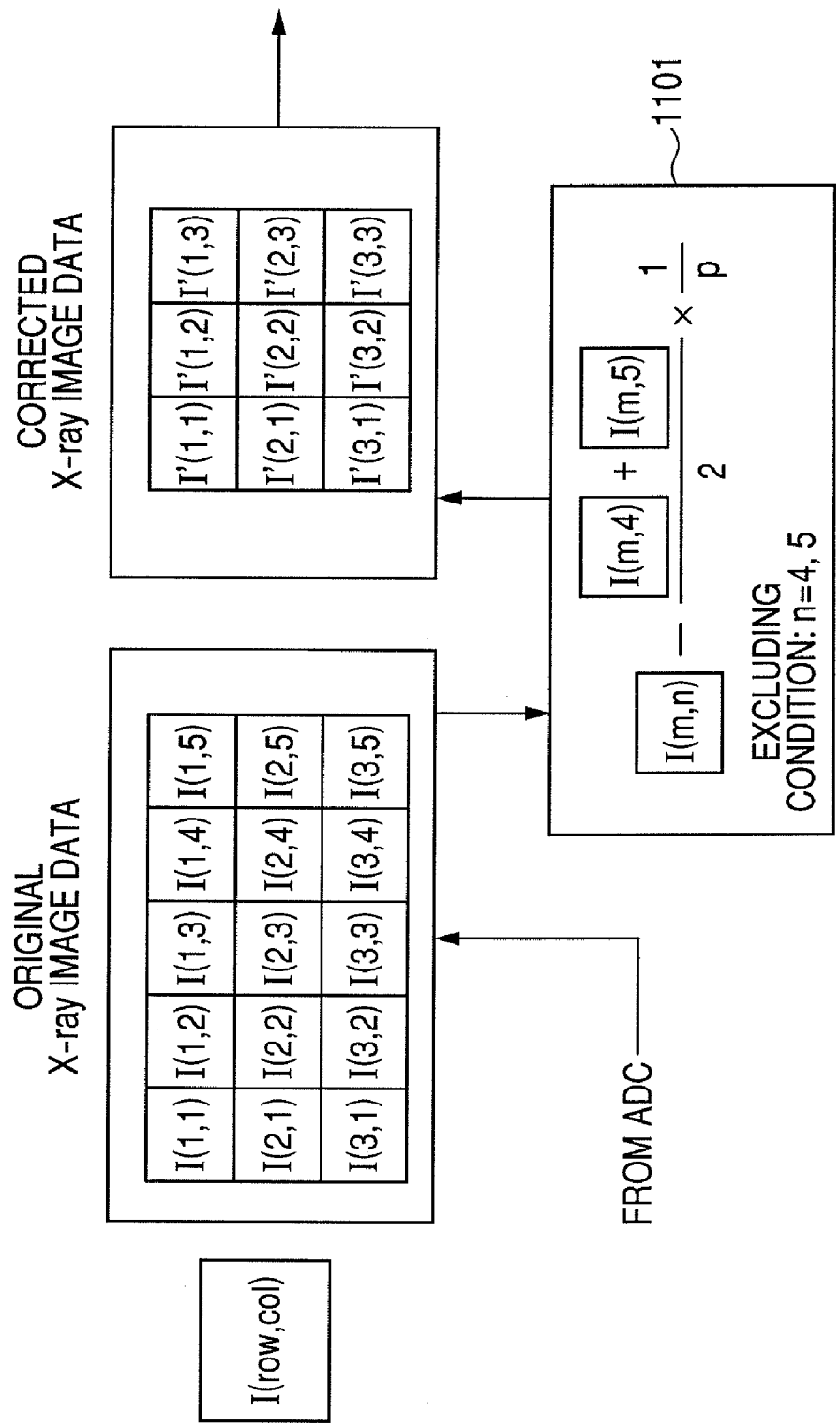
FIG. 9 is a conceptual diagram illustrating a correcting method for line noise in the second embodiment of the invention.

FIG. 9 is a conceptual diagram illustrating a correcting method of a line noise in the second embodiment of the invention. According to the correcting method of the second embodiment, the correction data I(m, 4) and I(m, 5) obtained from the two capacitor elements 301 and the two correction channels for the same period of time in correspondence to the reading operation of each row of the sensor array are averaged and, thereafter, a subtracting process with the X-ray image data I(m, n) is executed. That is, a line noise correction unit 1101 calculates the following equation in order to obtain the corrected X-ray image data I'(m, n):

$$I'(m,n)=I(m,n)-(I(m,4)+I(m,5))/(2\times p)$$

In the embodiment, by using a mean value of a plurality of correction data I(m, 4) and I(m, 5), a contribution degree of the random noise component which is generated in the capacitor elements 301 and correction channels connected thereto can be reduced at the time of the correcting process. Thus, the line noise can be corrected more accurately. The above random noise component includes a 1/f noise of the operation amplifier 205 and the variable gain amplifier unit 204 of the correction channel and a KTC noise of the transfer switch or the like used in the correction channel of the S/H circuit unit 207.

Also in the embodiment, in a manner similar to the first embodiment, if the reference power source 206 of the operation amplifier 205 is connected to the other electrode of the capacitor element 301, the ratio between the capacitance value of the capacitor element 301 and the parasitic capacitance value of the signal wirings Sig1 to Sig3 is assumed to be p. If the sensor power source 203 is connected to the other electrode of the capacitor element 301, the ratio between the capacitance value of the capacitor element 301 and the capacitance value between the bias wiring and the signal wirings Sig1 to Sig3 is assumed to be p and is obtained by the above equation.

Although an example in which the processed data is stored into another area in the frame memory 212 in FIG. 9 has been shown in the embodiment, the invention is not limited to such a method. A method whereby the corrected X-ray image data is overwritten to the X-ray image data before processing and the correction data I(m, 4) and I(m, 5) are finally deleted may be used in a manner similar to the first embodiment.

In a manner similar to the first embodiment, the correction unit 1101 in the embodiment illustrated in FIG. 9 may be one of the software which operates in a computer for executing the image processes of the radiation imaging system and the program which has been programmed in the LSI.

Third Embodiment

Figure 10:
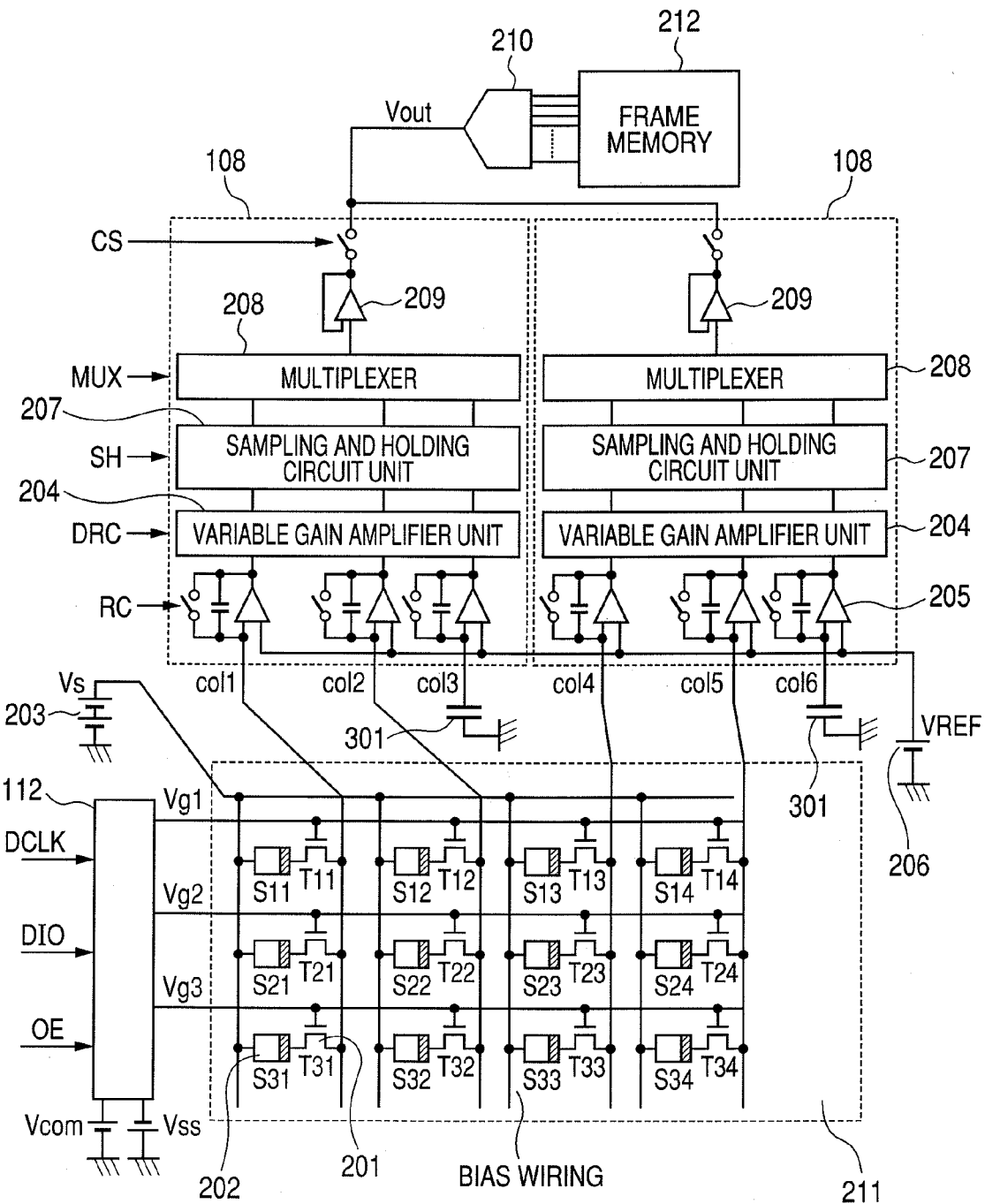
FIG. 10 is a schematic equivalent circuit diagram of a radiation imaging apparatus in the third embodiment of the invention.

A sensor array according to the third embodiment of the invention and a correcting process using the sensor array will now be described with reference to FIGS. 10 and 11. FIG. 10 is a schematic equivalent circuit diagram of a radiation imaging apparatus in the third embodiment of the invention. In the embodiment, the radiation imaging apparatus in which a plurality of reading out circuit units 108 are provided and one capacitor element 301 and one correction channel connected to the capacitor element 301 are arranged for each reading out circuit unit 108 will be described.

An example in which one set of the capacitor element 301 and the correction channel are arranged for one reading out circuit unit 108 is illustrated in FIG. 10 for convenience of description. However, in the embodiment, the number of sets of the capacitor elements 301 and the correction channels is not limited to the number as illustrated in FIG. 10 but, for example, ten sets of the capacitor elements 301 and the correction channels may be provided for each of the eleven reading out circuit units 108.

A case where there are a plurality of reading out circuit units 108 as mentioned above and one A/D converter 210 receives outputs of a plurality of reading out circuit units 108 will be described. In this case, a switch whose enabling state is controlled by the control signal CS is provided between the reading out circuit units 108 and the A/D converter 210, thereby allowing the outputs from the reading out circuit units 108 to be switched. The buffer amplifier 209 is provided in each reading out circuit unit 108. Other driving methods, functions, and the like are similar to those in the first embodiment and FIG. 1.

Figure 11:
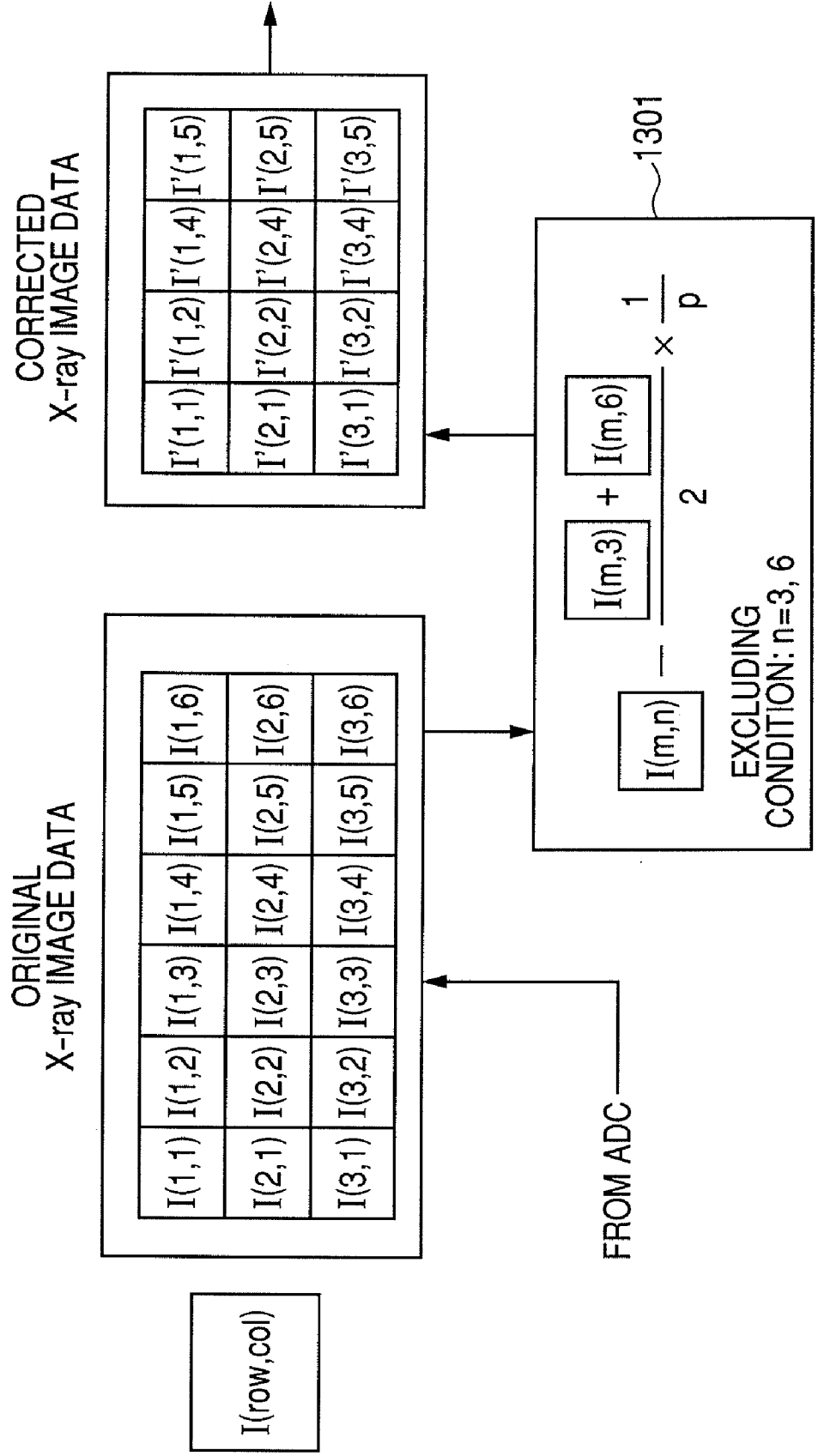
FIG. 11 is a conceptual diagram illustrating a correcting method for line noise in the third embodiment of the invention.

FIG. 11 is a conceptual diagram illustrating a correcting method of a line noise in the third embodiment of the invention. According to the line noise correcting method in the third embodiment, correction data I(m, 3) and I(m, 6) obtained from the two correction channels corresponding to the two reading out circuit units 108 for the same period of time as that of the reading operation of each row of the sensor array are averaged. After that, a subtracting process of the X-ray image data I(m, n) and the averaged correction data is executed. That is, a correction unit 1301 calculates the following equation in order to obtain the corrected X-ray image data I'(m, n):

$$I'(m,n)=I(m,n)-(I(m,3)+I(m,6))/(2\times p)$$

If there are three or more correction data, a plurality of correction data obtained for the same period of time are averaged, a subtracting process of the averaged correction data and the X-ray image data obtained for the same period of time is executed and the correcting process of the line noise is executed.

In the embodiment, by using the mean value of a plurality of correction data I(m, 3) and I(m, 6), a contribution degree of the random noise component which is generated in the capacitor elements 301 and correction channels connected thereto can be further reduced at the time of the correcting process in a manner similar to the second embodiment. Thus, the line noise can be corrected more accurately. The above random noise component includes the 1/f noise of the operation amplifier 205 and the variable gain amplifier unit 204 of the correction channel and the KTC noise of the transfer switch or the like used in the correction channel of the S/H circuit unit 207.

Figure 12:
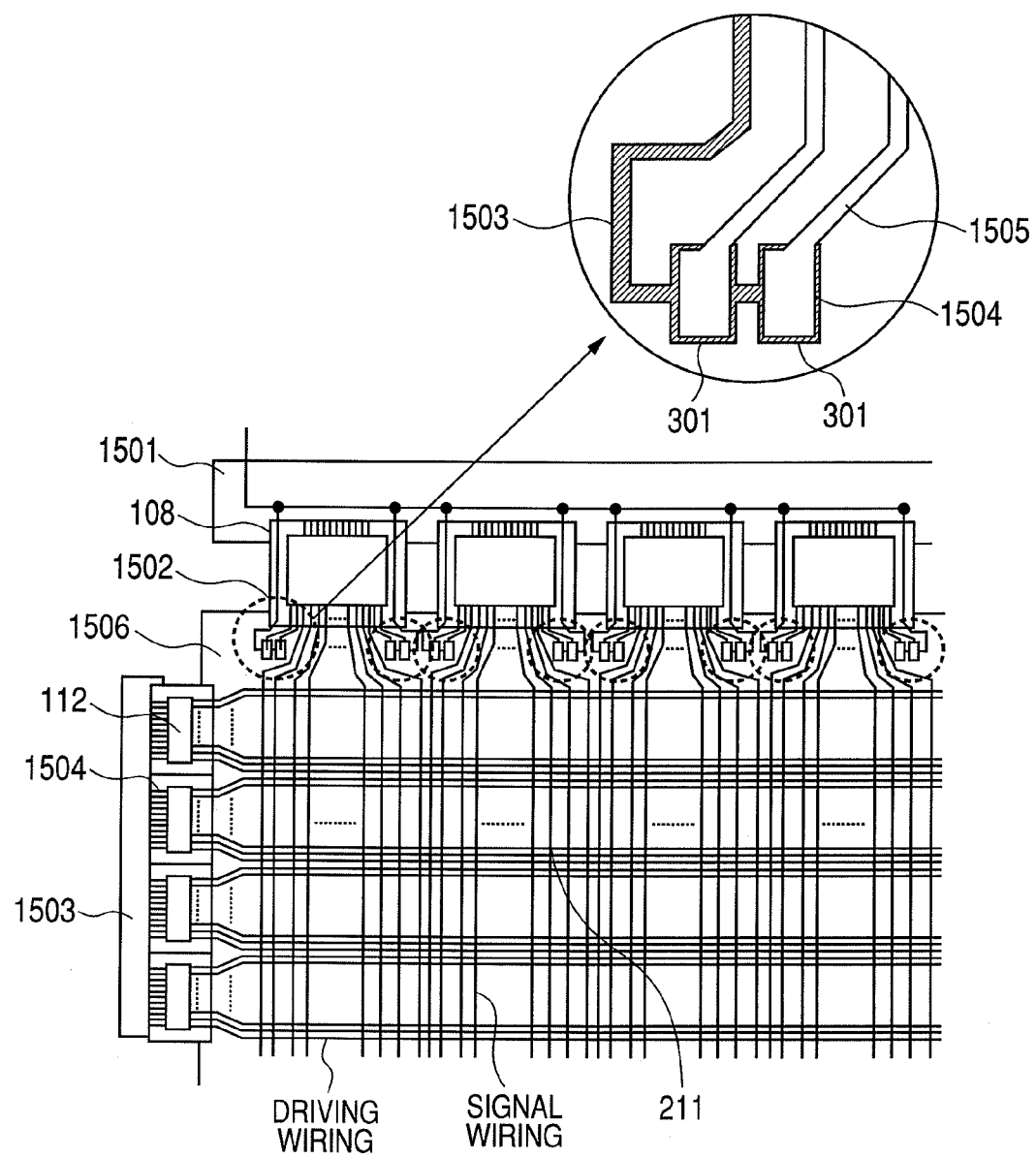
FIG. 12 is a schematic diagram typically illustrating a structure of the radiation imaging apparatus in the third embodiment of the invention.

A structure of the radiation imaging apparatus in the third embodiment of the invention will be described with reference to FIG. 12. FIG. 12 is a schematic diagram typically illustrating a structure of the radiation imaging apparatus in the third embodiment of the invention. A printed wiring board 1501 for reading out is provided. The reading out circuit units 108 are mounted on a TCP (Tape Carrier Package) 1502 for reading out formed by a flexible printed wiring board. Wirings 1503 and 1504 are connected to the capacitor elements 301. The wirings 1503 and 1504 are also first conductive layers each serving as one electrode of the capacitor element 301. A second conductive layer 1505 functions as the other electrode of the capacitor element 301 and a wiring connected to the other electrode. The pixel region 211 of the sensor array is provided on an insulating substrate 1506 such as a glass substrate. A printed wiring board 1507 for driving is provided. The driving circuit units 112 are mounted on a TCP 1508 for driving formed from a flexible printed wiring board. An area sensor of the radiation imaging apparatus is formed by a method whereby an IC chip of the reading out circuit units 108 and the driving circuit units 112 formed by the monosilicon process is mounted onto the TCP and the TCP is connected to the sensor array formed by a plurality of pixels, signal wirings, driving wirings, and bias wiring. Further, the TCPs 1502 and 1508 are electrically connected to the printed wiring boards 1501 and 1507 for applying various power source voltages to the reading out circuit units 108 and the driving circuit units 112 and transmitting and receiving signals thereto/therefrom, respectively.

The capacitor element 301 in the embodiment is formed on the insulating substrate 1506 outside of the pixel region 211 (outer periphery of the pixel region 211) of the sensor array surrounded by a circle shown by a broken line in FIG. 12. In the construction illustrated in FIG. 12, four capacitor elements 301 are provided for each reading out circuit unit 108.

A structure of the capacitor element 301 is illustrated in a region surrounded by a circle in FIG. 12. The capacitor element 301 is constructed by: the first conductive layers 1503 and 1504 each serving as one electrode of the capacitor element 301; the other electrode of the capacitor element 301 and the second conductive layer 1505 serving as a wiring connected to the other electrode; and an insulating layer (not shown) such as an amorphous silicon nitride film arranged between them.

One of the two electrodes 1503/1504 and 1505 of the capacitor element 301 is connected to a second operation amplifier in the reading out circuit unit 108. The other electrode is led out to the outside of the pixel region 211 of the sensor array through the TCP and is electrically connected to the sensor power source or the reference power source of the operation amplifier on the printed wiring board.

Although the four reading out circuit units 108 and the four driving circuit units 112 are provided in the embodiment, the number of reading out circuit units 108 and the number of driving circuit units 112 are not limited to 4 but a necessary number of reading out circuit units 108 and driving circuit units 112 may be properly provided according to the number of pixels of the sensor array or an area of the pixel region 211.

Fourth Embodiment

Figure 13:
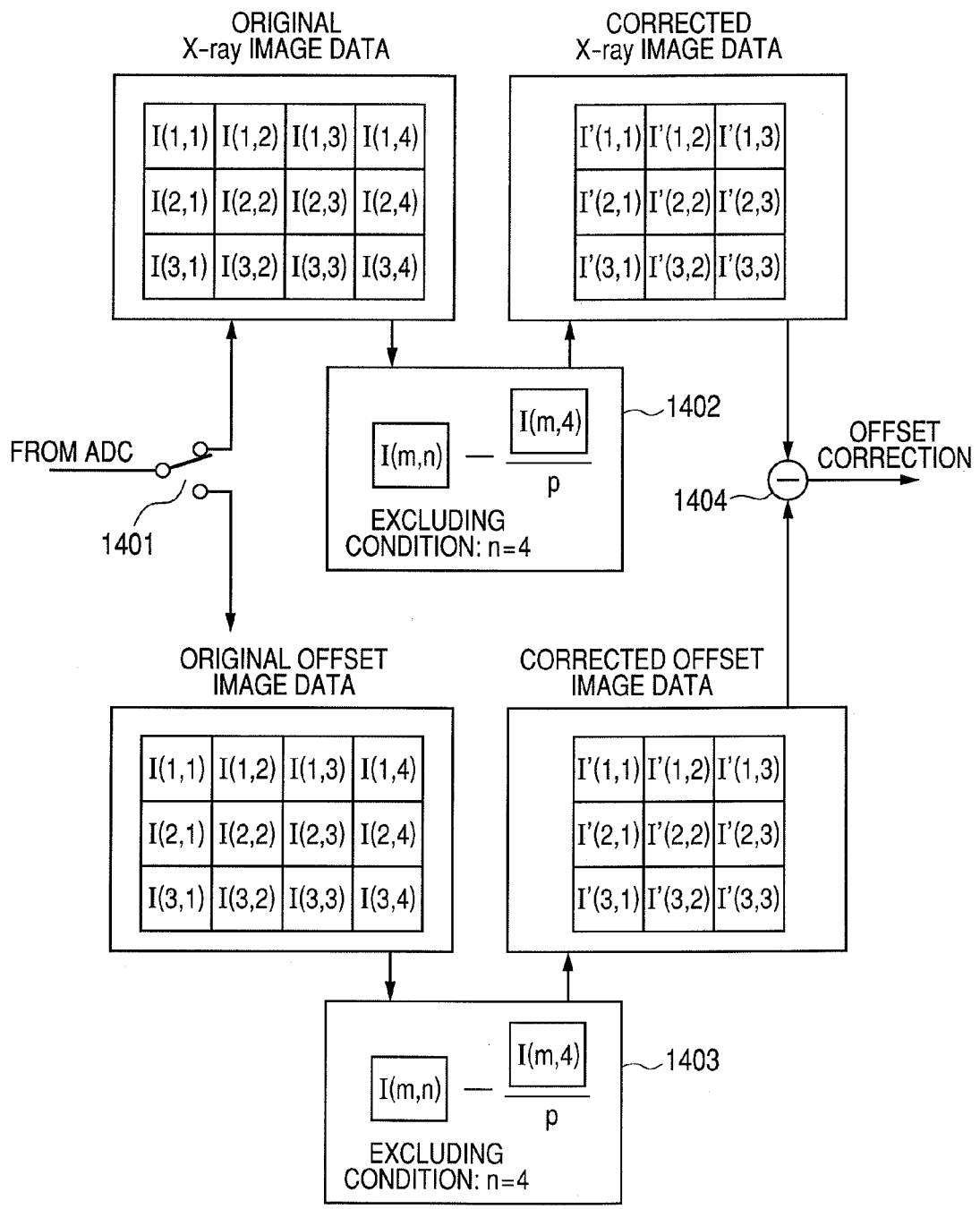
FIG. 13 is a conceptual diagram for describing a correcting method using a radiation imaging apparatus in the fourth embodiment of the invention.

An image processing method using a radiation imaging apparatus in the fourth embodiment of the invention will now be described with reference to FIG. 13. FIG. 13 is a conceptual diagram for describing a correcting method using the radiation imaging apparatus in the fourth embodiment of the invention. In the embodiment, in addition to the obtainment of the X-ray image described in one of the first to third embodiments, data of an offset image is obtained and a correction is made by using the offset image data. The correction using the offset image data denotes a process for correcting an X-ray image by using an image which includes a noise component such as FPN (Fixed Pattern Noise) and the like and which has been fetched without irradiating the X-ray. A point that the fourth embodiment differs from the first embodiment will be described hereinbelow.

Since the offset image is an image in which the signals of the pixels have been fetched without irradiating the X-ray as mentioned above, it is an image in which a dark current of the pixel, an output of the defective pixel, an electric offset component, and the like are dominant. By subtracting the offset image from the X-ray image, the dark current of the pixel, the output of the defective pixel, and the electric offset component which exist in the X-ray image are removed, so that picture quality can be improved.

However, since the line noise is also multiplexed to the offset image itself, if the correcting process is executed by the offset image containing the line noise, an influence of the line noise of the offset image is exerted on the X-ray image. In the embodiment, therefore, in addition to the correction in the first embodiment, after the line noise which is multiplexed to the offset image is further corrected, the offset of the X-ray image is corrected, so that the multiplex of the line noise can be suppressed.

The data of the X-ray image and the data of the offset image obtained from the sensor array are written in the frame memory. As schematically illustrated in FIG. 13, a correction unit 1403 makes a correction by correcting data I(m, n) of each offset image by the correction data I(m, 4) from the capacitor element 301 obtained simultaneously with the offset image data. That is, in a manner similar to the first embodiment, the correction unit 1403 calculates the following equation in order to obtain corrected offset image data I'(m, n):

$$I'(m,n)=I(m,n)-I(m,4)/p$$

The processing of the X-ray image data and the operation of the correction unit 1402 are omitted because their details have been described in the first embodiment. A switch 1401 switches the processes of the X-ray image and the offset image.

A subtracting unit 1404 executes a subtracting process of the corrected X-ray image data and the corrected offset image data obtained as mentioned above and outputs the offset corrected X-ray image data.

A radiographing method in which the offset correction is made as shown in the embodiment can be embodied in any one of the first to third embodiments. Although the two correction units 1402 and 1403 for the X-ray image and the offset image are prepared in FIG. 13, they are illustrated in the diagram for convenience of description. If the timing for obtaining the X-ray image and the timing for obtaining the offset image are deviated, the line noise correcting processes of those two images can be executed by one correction unit. In the embodiment, the offset image may be obtained just after completion of the X-ray radiographing or can be also previously obtained before the X-ray radiographing. In a manner similar to the first embodiment, the correction units 1402 and 1403 and the subtracting unit 1404 can be realized by a method whereby the control PC 103 executes a program.

According to the invention, the line noise included in the obtained X-ray image is obtained simultaneously with the obtainment of the image by an element for correction prepared separately from the sensor array which is used to obtain the image and by a reading out circuit connected to such a correction element. By correcting the X-ray image by the data having the line noise component, the line noise in the image can be properly removed.

Since the capacitor element is used as a correction element, unlike the case of using a dark output of the pixel, an influence by a noise due to a dark current of the pixel or an influence by a fixed pattern noise due to a thermal noise, a lattice defect, or the like is reduced.

By setting a capacitance of the capacitor element as a correction element to a value which is larger than, desirably, a value which is integer times as large as a capacitance of the signal wiring, sensitivity of the line noise can be raised. In such a case, by multiplying the line noise data detected at the time of the correcting process by a coefficient p as a ratio between the signal wiring capacitance and the capacitance of the correction element, the line noise can be properly corrected.

According to the method as mentioned above, by the subtracting process, a degree at the time when the random noise component generated in the reading out circuit unit is multiplexed as a line noise is suppressed and the line noise can be more effectively removed.

As a second reading out circuit and a correction element, since the second reading out circuits and correction elements of the numbers as many as the number of signal wirings are not always necessary, they can be easily mounted. Since there is no need to change the structure of the pixel region 211 of the sensor array, there is such an advantage that the characteristics of the sensor array are not sacrificed.

In each of the above embodiments, only a specific example for embodying the invention has been shown. A technical scope of the invention should not be limitatively interpreted by those examples. That is, the invention can be embodied by various forms without departing from its technical idea or its principal feature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A radiation imaging apparatus comprising:
a conversion unit having a pixel region in which a plurality of pixels are arranged in a matrix, wherein the pixel includes a conversion element converting radiation into an electric charge and a switch element outputting an electric signal based on the electric charge, and a signal wiring connected to the plurality of switching elements arranged along a column;
a capacitor element arranged outside of the pixel region;
a reading out circuit unit connected to the signal wiring and the capacitor element for reading out the electric signals from the pixels row by row, wherein the reading out circuit unit reads out, in parallel, a signal from the capacitor element and the electric signal from the pixel, and wherein the reading out circuit unit includes a first operation amplifier arranged for the signal wiring and a second operation amplifier connected electrically to the capacitor element, and wherein the read out circuit unit samples and holds signals from the first and second operation amplifiers in parallel; and
a correction unit for correcting a signal from the first operation amplifier based on a signal from the second operation amplifier.

2. The radiation imaging apparatus according to claim 1, wherein the reading out circuit unit reads out, in parallel, the signal from the capacitor element and the electric signals from the pixels of a predetermined row, and also reads out, in parallel, the signal from the capacitor element and the electric signals from the pixels of the other row different from the predetermined row.

3. The radiation imaging apparatus according to claim 1, wherein the conversion unit has a wavelength converter for converting a radiation into light, and a photoelectric conversion element for converting the light into the electric charge.

4. The radiation imaging apparatus according to claim 1, wherein the switching element is a thin film transistor formed on an insulating substrate.

5. The radiation imaging apparatus according to claim 1, wherein the switching element is a thin film transistor formed on an insulating substrate.

6. A controlling method of a radiation imaging apparatus comprising:
a conversion unit having a pixel region in which a plurality of pixels are arranged in a matrix, wherein the pixel includes a conversion element converting radiation into an electric charge and a switch element outputting an electric signal based on the electric charge, and a signal wiring connected to the plurality of switching elements arranged along a column;
a capacitor element arranged outside of the pixel region; and
a reading out circuit unit connected to the signal wiring and the capacitor element for reading out the electric signals from the pixels row by row, and including a first operation amplifier arranged for the signal wiring and a second operation amplifier connected electrically to the capacitor element,
wherein the method comprises steps of:
reading out by the reading out circuit unit, in parallel, a signal from the capacitor element and the electric signal from the pixel, and sampling and holding signals from the first and second operation amplifiers in parallel; and
correcting a signal from the first operation amplifier based on a signal from the second operation amplifier.

7. A non-transitory computer-readable recording medium storing a readable program for operating a computer to execute a controlling method of a radiation imaging apparatus comprising:
- a conversion unit having a pixel region in which a plurality of pixels are arranged in a matrix, wherein the pixel includes a conversion element converting radiation into an electric charge and a switch element outputting an electric signal based on the electric charge, and a signal wiring connected to the plurality of switching elements arranged along a column;
- a capacitor element arranged outside of the pixel region; and
- a reading out circuit unit connected to the signal wiring and the capacitor element for reading out the electric signals from the pixels row by row, and including a first operation amplifier arranged for the signal wiring and a second operation amplifier connected electrically to the capacitor element, wherein the program operates the computer to execute steps of:

reading out by the reading out circuit unit, in parallel, a signal from the capacitor element and the electric signal from the pixel, and sampling and holding signals from the first and second operation amplifiers in parallel; and correcting a signal from the first operation amplifier based on a signal from the second operation amplifier.

\* \* \* \* \*